United States Patent
Murphy et al.

(10) Patent No.: US 11,607,751 B2
(45) Date of Patent: Mar. 21, 2023

(54) LAMINATE INCLUDING WELDABLE REGIONS

(71) Applicant: Material Sciences Corporation, Elk Grove Village, IL (US)

(72) Inventors: Matthew Murphy, Birmingham, MI (US); Bryan Tullis, South Lyon, MI (US); Peter Bortell, Tecumseh, MI (US)

(73) Assignee: Material Sciences Corporation, Elk Grove Village, IL (US)

( * ) Notice: Subject to any disclaimer, the term of this patent is extended or adjusted under 35 U.S.C. 154(b) by 743 days.

(21) Appl. No.: 16/465,390

(22) PCT Filed: Dec. 1, 2016

(86) PCT No.: PCT/US2016/064362
§ 371 (c)(1),
(2) Date: May 30, 2019

(87) PCT Pub. No.: WO2018/101945
PCT Pub. Date: Jun. 7, 2018

(65) Prior Publication Data
US 2020/0001405 A1    Jan. 2, 2020

(51) Int. Cl.
*B23K 35/00*   (2006.01)
*B23K 35/02*   (2006.01)
(Continued)

(52) U.S. Cl.
CPC ............ *B23K 35/001* (2013.01); *B23K 35/02* (2013.01); *B23K 35/0255* (2013.01);
(Continued)

(58) Field of Classification Search
None
See application file for complete search history.

(56) References Cited

U.S. PATENT DOCUMENTS 3,762,028 A * 10/1973 Swearingen et al. .. B23K 21/00
29/470.1
2007/0187469 A1    8/2007 Chen et al.
(Continued)

FOREIGN PATENT DOCUMENTS

EP    0412816 A2    2/1991
WO    WO 2011082128 A1 *  7/2011  ............. B23K 11/16
(Continued)

OTHER PUBLICATIONS

Machine translation of WO 2016140244 A1 performed on Jan. 20, 2022, Kuroda (Year: 2016).*
(Continued)

*Primary Examiner* — Brian W Jennison
*Assistant Examiner* — Kevin Guanhua Wen
(74) *Attorney, Agent, or Firm* — Quinn IP Law

(57) ABSTRACT

A laminate sheet including a weldable margin is formed by laminating metal sheets having a core layer disposed therebetween. The core layer is formed of a core material which includes one or more of a viscoelastic, adhesive and acoustic material. The core layer is selectively distributed such that the laminate sheet includes an adhered region providing a laminate structure, and a non-adhered region including a weldable margin. The non-adhered region is adjacent an edge of the core layer and is characterized by a gap between the first and second metal sheets and by an absence of the core layer in the gap. The non-adhered region defines a weldable margin adjacent a core edge configured such that a weld is formable in the weldable margin without heat affecting the core layer. The laminate sheet can be joined by fasteners installed in the non-adhered region.

19 Claims, 12 Drawing Sheets

(51) Int. Cl.
*B23K 35/28* (2006.01)
*B32B 15/06* (2006.01)
*B32B 15/082* (2006.01)
*B32B 15/09* (2006.01)
*B32B 15/095* (2006.01)
*B32B 15/098* (2006.01)
*B32B 15/20* (2006.01)

(52) U.S. Cl.
CPC ............ *B23K 35/286* (2013.01); *B32B 15/06* (2013.01); *B32B 15/082* (2013.01); *B32B 15/09* (2013.01); *B32B 15/095* (2013.01); *B32B 15/098* (2013.01); *B32B 15/20* (2013.01)

(56) References Cited

U.S. PATENT DOCUMENTS

2010/0040902 A1\* 2/2010 Mizrahi .................. B32B 3/30
                                                             428/600
2014/0120364 A1\* 5/2014 Peca et al. .............. B32B 15/08
                                                             428/614

FOREIGN PATENT DOCUMENTS

WO    WO 2016140244 A1 \*  9/2016  ............... H05K 9/00
WO        2016178954 A1    11/2016

OTHER PUBLICATIONS

Machine translation of WO 2016140244 A1 performed on Jun. 8, 2022, Kuroda (Year: 2016).\*
International search report on international application PCT/US2016/064362.

\* cited by examiner

LAMINATE INCLUDING WELDABLE REGIONS

TECHNICAL FIELD

The present disclosure relates to a laminate of metal sheets having an adhered region including a core layer disposed between and connected to the metal sheets, and a non-adhered region, a method of forming the laminate, and a method of welding the laminate.

BACKGROUND

A laminate sheet made of metal sheets including a viscoelastic core disposed therebetween is less dense than a monolithic (solid) metal sheet of the same thickness, such that the laminate sheet and/or structural components formed therefrom provides a weight savings over the monolithic metal sheet and/or like components formed therefrom. Monolithic metal sheet and monolithic structural components formed from monolithic sheet can be joined to other metal components by welding. However, welding of laminate sheet differs from welding of monolithic sheet, due to liquefying and/or vaporizing of the core layer which can occur during the welding process due to the heat generated during formation of the weld, where the liquefied and/or vaporized viscoelastic material can contaminate the weld being formed and/or contribute to the formation of porosity in the weld, where porosity and/or contamination in the weld can decrease the durability, fatigue strength and overall integrity of the weld.

Laminate sheet can including a damping layer, such that a comparable monolithic metal sheet may be noisier, e.g., may exhibit less favorable noise-vibration-harshness (NVH) characteristics as compared with the laminate sheet, where the monolithic metal sheet can be more susceptible to vibration and resonance and more sensitive to frequency management than the laminate sheet. As such, structural components formed from monolithic metal sheet often require modification by adding damping coatings and/or damping componentry such as damping patches to provide acceptable NVH behavior. Such added treatments, coatings and/or damping componentry add cost and weight to the monolithic component.

Structural components formed from sheet material can include complex shapes and features, such as bends, ribs, beads, offsets, depressions, channels, contours and the like, which are added to improve stiffness, rigidity, and/or bending strength to the structural component. Such complex features can be difficult to form, can increase tool wear of the forming tool, and can protrude from the sheet, increasing the packaging space required by the structural component. Components formed from laminate sheet can exhibit up to 40% less stiffness than similar structural components made from monolithic sheet, such that additional complex features may be required in components formed from laminate sheet to further increase the stiffness, rigidity and/or bending strength of the component made from the laminate sheet, relative to a similar component made from a monolithic sheet.

As such, it is desirable to provide a laminate sheet material which may be formed into a laminate structural component which, relative to a monolithic structural component formed from a monolithic metal sheet, exhibits relatively lower weight and relatively better damping characteristics, is attachable to other components by welding, and can be selectively stiffened without increasing packaging space or feature complexity.

SUMMARY

A laminate sheet including first and second metal sheets and a core layer disposed therebetween, and methods for forming, welding, fastening, and selectively stiffening the laminate sheet and/or a structural component formed from the laminate sheet are described. The laminate sheet includes at least one adhered region and at least one non-adhered region. The adhered region is defined by a laminate structure which includes a core layer between and bonding metal sheets in the adhered region. The non-adhered region is defined by a gap between the first and second metal sheets formed by an absence of the core layer in the non-adhered region. The core layer can be characterized by one or more of adhesive, acoustic, and viscoelastic properties, such that the core layer may also be referred to herein as an adhesive core layer, a viscoelastic core layer, a viscoelastic adhesive core layer, an acoustic core layer, and/or an acoustic adhesive core layer of the laminate sheet. The core layer has a core edge which defines a boundary between the adhesive and the non-adhesive regions.

The laminate sheet, including one or more adhered regions defined by a laminate structure including the core layer, is advantaged by being formable into a structural component which provides vibration damping at a substantially lower weight and good noise-vibration-harshness (NVH) performance, relative to a structural component formed of a monolithic metal sheet, without requiring added treatments, such as sound dampening coatings or patches, and while being attachable to other components by welding. In one example, welded structural features provided in the structural component formed from the laminate sheet can be substituted for, and/or additive to, the formed structural features, to increase one or more of the stiffness, rigidity, and bending strength of laminate structural component without adding forming complexity or increasing the packaging space of the laminate structural component. A structural component, as that term is used herein, refers to a component, formed from a sheet material such as a monolithic sheet and/or a laminate sheet, which has a complex shape, e.g., a shape other than flat sheet, and is used in a structural application. For example, the complex shape of a structural component can be defined by one or more features, such as one or more of a bend, rib, aperture, bead, offset, chamfer, depression, channel, curve, contour, extruded portion, or other feature formed into the laminate structure to define the structural component. The term "structural component" is non-limiting, such that a structural component may have nominal or minimal load bearing requirements. In a non-limiting example, the laminate sheet described herein can be formed into structural components for vehicle applications, such as close-out panels, also known as dash panels or floor panels, which provide structure to the vehicle by separating, respectively, the engine compartment or trunk compartment from the passenger compartment. Other non-limiting examples of vehicle structural components which may be formed from the laminate sheet including the laminate structure include wheel well, transmission tunnel covers, cowl plenums, etc.

The laminate sheet described herein includes one or more weldable margins defined by the one or more non-adhered region. The weldable margin is therefore characterized by an absence of the core layer between the portions of the metal sheets, and as such, the laminate sheet or a structural component formed therefrom can be joined to another sheet or component by a weld formed in the weldable margin, e.g., by forming a weld in the non-adhered region. Due to the absence of the core layer in the weldable margin, weld formation in the weldable margin can be accomplished with minimal or negligible heat transfer to the core layer from the heat affected zone of the weld, such that vaporizing and/or liquefying of the core layer is prevented. As such, the core layer at the edge of the core adjacent the weld remains intact, the adhesive, acoustic, and/or sound dampening properties of the laminate structure adjacent the weld remains intact, and, because the core layer remains intact, contamination of the weld with core material and/or porosity contamination in the weld due to weld contamination by the core material is avoided, providing a weld with integrity, strength and durability.

The method of forming the laminate sheet includes selectively applying a core material to a first metal sheet, and laminating the first metal sheet to a second metal sheet such that the core material is disposed between and bonded to the first and second metal sheets to form a laminate sheet including a core layer made from the core material, where the core layer includes, e.g., is bounded by, a core edge. The core material is selectively applied to only a portion of the first metal sheet, such that after laminating the laminate sheet includes an adhered region formed on the portion of the sheet where the core material has been selectively applied, and a non-adhered region defined by the remaining portion of the sheet where none of the core material has been applied. As such, the adhered region is defined by a laminate structure including the first and second metal sheets and the core layer bonded therebetween, the core edge defines a boundary between the adhered region and the non-adhered region, and the non-adhered region is defined by a gap between the first and second metal sheets and an absence of the core material in the gap. The non-adhered region includes a weldable margin immediately adjacent the core edge and characterized by a margin width which is sufficiently wide such that a metal weld joining the first and second metal sheets is formable within the weldable margin, and such that the core edge is substantially unaffected by heat generated by formation of the weld. In one example, the core material can be applied to the first sheet as a dry adhesive film configured to define the adhered region. In another example, the core material can be selectively applied to only a portion of the sheet to define the adhered region by spraying or rolling the core material onto the sheet.

In one example, the non-adhered region extends continuously between the core edge and an edge of the laminate sheet to define a weldable margin. The weldable margin includes a weld portion immediately adjacent the core edge, and a trim portion intermediate the weld portion and the laminate sheet edge. The method can further include, for this example, applying a holding force to the trim portion of the laminate sheet, and applying a forming force to the adhered region of the laminate sheet while continuing to apply the holding force to the trim portion of the laminate sheet, to form the laminate sheet into a structural component including the adhered region and the weld portion, and/or remove the trim portion from the laminate sheet. The structural component can include one or more formed structural features, such as, by way of example, ribs, channels and contoured portions, which may be formed during and/or after forming of the structural component.

In another example, where the core edge is continuous, and the non-adhered region is adjacent the continuous core edge and surrounded by the adhered region, the weldable margin includes a weld portion immediately adjacent the continuous core edge such that the weld portion is a continuous weld portion, and a trim portion surrounded by the continuous weld portion. The method can further include, for this example, applying a holding force to the trim portion of the laminate sheet, and applying a forming force to the adhered region of the laminate sheet while continuing to apply the holding force to the trim portion of the laminate sheet such that the forming force removes the trim portion from the laminate sheet to form an aperture in the laminate sheet where the aperture is defined by the continuous weld portion.

The laminate sheet including the adhered region and the non-adhered region defining a weldable margin adjacent the adhered region can be welded by positioning a component to be welded to the sheet adjacent to the weldable margin of the laminate sheet, and welding the laminate sheet to the component by forming a metal weld joining the first and second metal sheets to the component, where the metal weld is positioned within the weldable margin such that core edge is substantially unaffected by heat generated during forming of the weld. The metal weld can be positioned within the weldable margin such that a space is formed in the gap between the core edge and the metal weld, where the space insulates the core edge from heat generated by formation of the weld, and further separates the core edge from the weld such that the weld is not contaminated by the core material forming the core layer.

In one example, prior to welding the laminate sheet to the component, the method can include applying a forming force to the laminate sheet to form the laminate sheet into a structural component including the adhered region and the weldable margin. The structural component formed from the laminate sheet can then be attached by welding to another component, by positioning the component adjacent the weldable margin of the structural component prior to welding, and forming the weld within the weldable margin to join the structural component to the another component. In another example, the laminate sheet can include a weldable insert disposed in the gap between the first and second sheets, such that welding the laminate sheet to the component includes forming the metal weld such that the metal weld joins the first and second metal sheets, the weldable insert, and the component.

In one example, one or more welds can be formed within a non-adhered region to form a welded structural feature, where the welded structural feature acts to stiffen and/or strengthen the laminate sheet in the localized portion of the laminate sheet including the non-adhered region and the welded structural feature.

In one example the method can include installing one or more fasteners in a non-adhered region of the laminate sheet to form a fastened structural feature. The laminate sheet can be strengthened and/or stiffened in the localized area of the laminate sheet where the fastened structural feature is formed. The fastened structural feature can include a joint interface defined by the first and second metal sheets in direct contact with each other, for example, in the non-adhered region proximate the fastener. The method can include attaching a component to the laminate sheet by forming the fastened structural feature in the non-adhered region, where the fastener and/or the fastened structural feature contacts the component to attach the component to the laminate sheet within the non-adhered region.

The laminate sheet can be formed with various configurations of the adhered and non-adhered regions. For example, the laminate sheet can include an adhered region bounded by a continuous core edge where the non-adhered region is intermediate the core edge and the edge of the laminate sheet edge. In another example, where the laminate sheet defines a longitudinal axis, the core edge can be substantially parallel to the longitudinal axis. Other configurations are possible, and the examples described herein are non-limiting. For example, the shapes of the adhered and non-adhered regions can be regular or irregular, and may be symmetrical or asymmetrical relative to a longitudinal axis of the laminate sheet.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
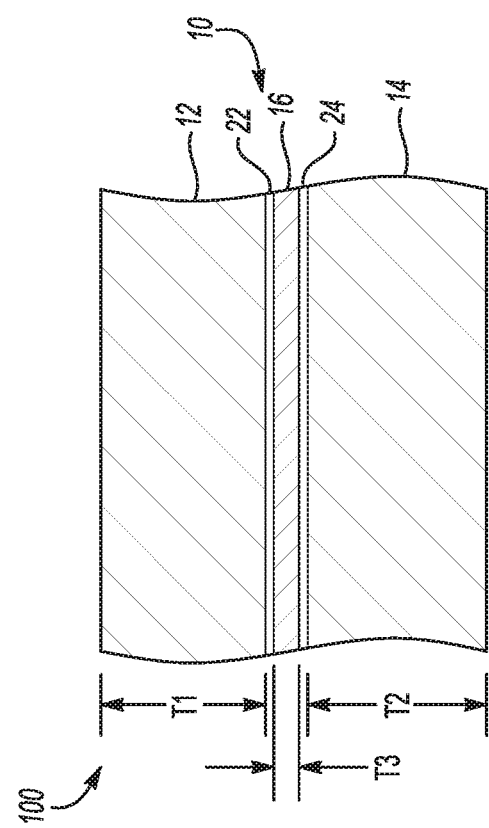
FIG. 1 is a schematic view of a cross-section of a first example laminate structure including a core layer disposed between metal sheets.

The elements shown in FIGS. 1-20 are not necessarily to scale or proportion, and the arrangement of elements shown in FIGS. 1-20 are not intended to be limiting. Accordingly, the particular dimensions and applications provided in the drawings presented herein are not to be considered limiting. Referring to the drawings wherein like reference numbers represent like components throughout the several figures, there is shown in FIGS. 1-4 a laminated material generally indicated at 100, also referred to herein as a laminate structure or as a laminate. The laminate structure 100 includes opposing metal sheets 12, 14 which are connected by a core layer 10 disposed therebetween. Each of the metal sheets 12, 14 is made of a metal-based material. By way of non-limiting example, the metal can be one of an aluminum-based, steel-based, stainless steel, nickel-based, titanium-based or other weldable metal-based material. The term "sheet" as used herein in the context of aluminum-based materials is understood as being a rolled aluminum alloy product with a uniform thickness. In a non-limiting example, the aluminum-based sheet can have a thickness of less than 6 mm. The term "sheet" as used herein in the context of steel-based material and stainless steel material is understood as being a rolled steel alloy product with a uniform thickness. In a non-limiting example, the steel sheet can have a thickness of less than 6 mm. By way of non-limiting example, each of the metal sheets 12, 14 may be referred to herein as a skin, metal layer, metal sheet, aluminum layer, aluminum sheet, steel sheet, steel layer, substrate, and/or base substrate. The core layer 10 includes a core 16 which has noise-vibration-harshness (NVH) characteristics and bond strength such that the core layer 10 in combination with the metal sheets 12, 14 provide a laminate structure 100 which is characterized as a noise damping structure, also referred to herein as a damping structure. The core 16 may also be referred to herein as a core 16 including a core material having adhesive properties, as a viscoelastic core 16 including a core material having viscoelastic properties, and/or as an acoustic core 16 including a core material having acoustic properties. The core 16 can be made of a combination of materials such that the core 16 is characterized by more than one of adhesive, acoustic and viscoelastic properties, and/or may be made of a material which is characterized by more than one of adhesive, acoustic and viscoelastic properties. In one example, the core 16 includes a viscoelastic material such that the core 16 substantially defines the damping properties of the laminate structure 100. In one example, the core 16 includes an acoustic material such that the core 16 substantially defines the acoustic properties of the laminate structure 100.

A laminate sheet 200, shown for example, in FIGS. 5, 11, 13, 15 and 17, includes a core layer 10 which spans selective portions of the metal layer 12 and the metal layer 14, such that after laminating laminate sheet 200 including the metal layers 12, 14 and the core layer 10, the core layer 10 is disposed therebetween to form the laminate structure 100 in the one or more adhered regions 90, where the laminate structure 100 is characterized by the core layer 10 adhering (i.e., rigidly attaching) the two metal sheets 12, 14 together in the adhered region 90 such that the core layer 10 is constrained by the metal layers 12, 14 in the adhered region 90. As shown, for example, in FIGS. 5, 11, 13, 15 and 17, and as described in further detail herein, the laminate sheet 200 includes at least one adhered region 90 defined by the laminate structure 100, and at least one non-adhered region 84 defined by an absence of the core layer 10 between the first and second metal sheets 12, 14, to provide a gap 62 between the first and second metal sheets 12, 14 in the non-adhered region 90. In one example shown in FIGS. 11 and 12, a weldable insert may be inserted into, e.g., disposed in, the gap 62.

Figure 17:
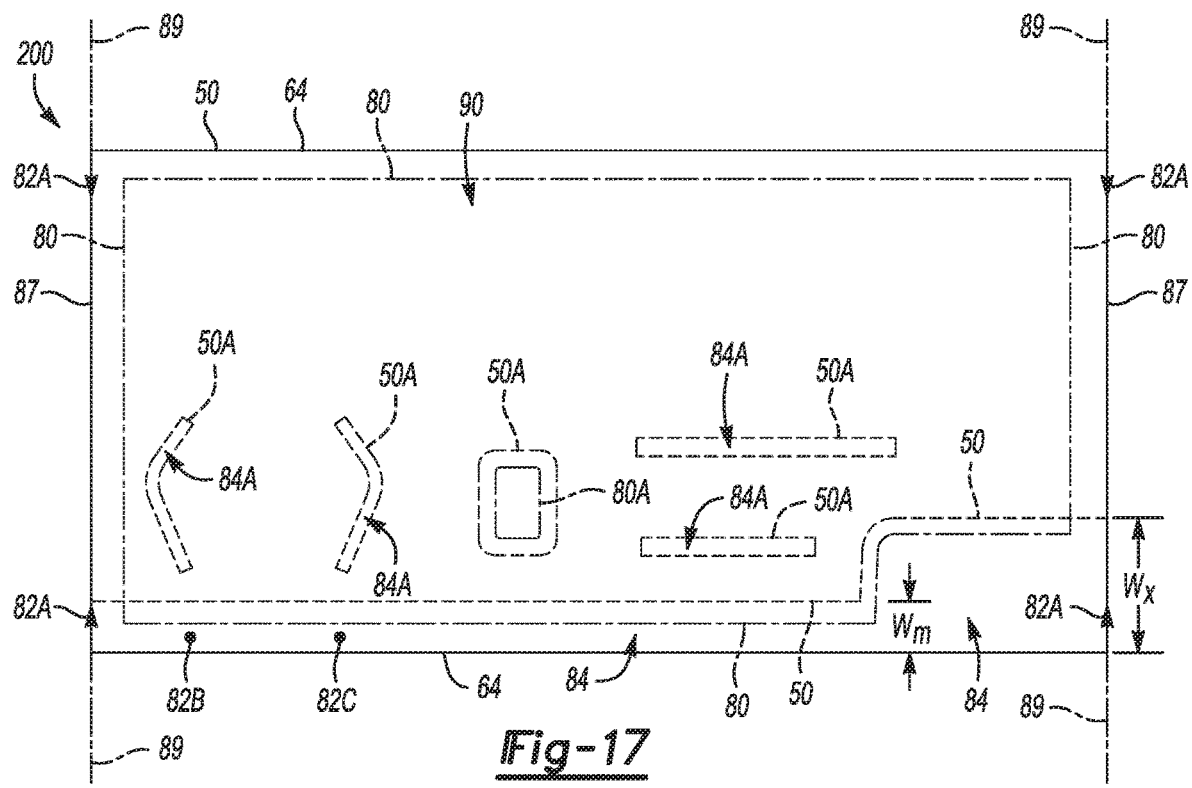
FIG. 17 is schematic top view of a laminate sheet including a plurality of non-adhered regions shown in phantom.
Figure 18:
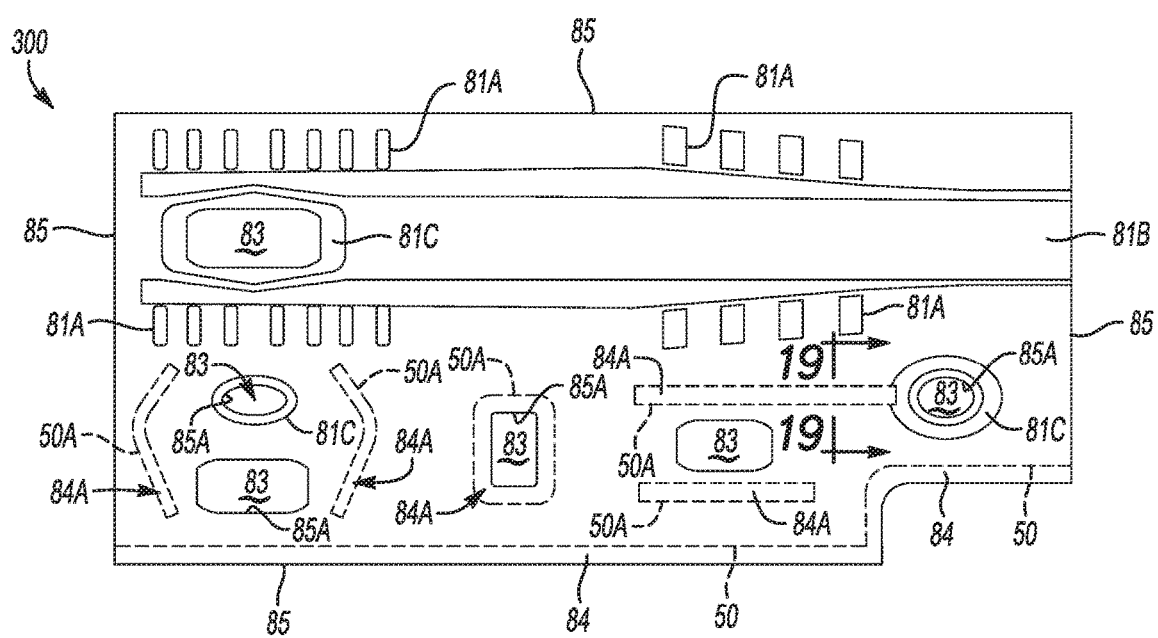
FIG. 18 is a schematic top view of a structural component formed from the laminate sheet of FIG. 17, including a plurality of structural features formed in the structural component.
Figure 19:
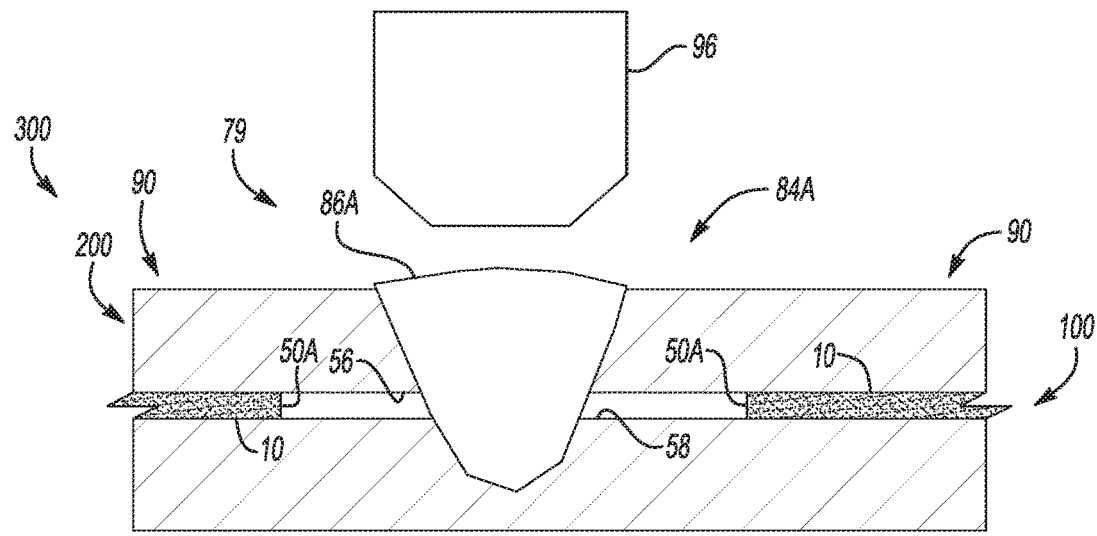
FIG. 19 is schematic cross-sectional view of section 19-19 of FIGS. 18 and 20, showing a welded structural feature including a weld formed in a non-adhered region of the structural component of FIG. 18.

As shown in FIGS. 1-4, the laminate structure 100 formed within the adhered region 90 may include additional layers such as additional substrate layers and coating layers, and the core layer 10 may include a plurality of layers including one or more adhesive layers, sound-damping viscoelastic layers, coating layers, electrically or thermally conductive layers, corrosion prevention layers, etc. such that it would be understood that the examples shown in FIGS. 1-4 are illustrative and are not intended to be limiting. The laminate sheet 200 described herein may be formed into a structural component, where there is a particular need for enhancing structural reinforcement, vibration and/or sound damping, thermal insulation and/or acoustic absorption, for example, between spaces or areas separated by the structural component formed of the laminate sheet 200. In an illustrative example, a laminate sheet 200 including an adhered region 90 and a plurality of non-adhered regions 84, 84A is shown in FIG. 17, and is formed into an example structural component 300 shown in FIGS. 18 and 20, as described in further detail herein. After forming the structural component 300 shown in FIG. 18, welds 86A, as shown in FIG. 19, are welded in selected non-adhered regions 84A to form welded structural features 79. The welded structural features 79 increase the stiffness, rigidity, and/or bending strength of the structural component 300, such that the welded structural features 79 can be substituted for formed structural features 81A, 81B, 81C, referred to collectively herein as formed structural features 81, to reduce the forming complexity of the structural component 300 and/or avoiding the additional packaging space which would be consumed if additional formed structural features 79 were required in lieu of the welded structural features 79.

The laminate sheet 200 is advantaged by being formable into a structural component 300 which provides desired levels of vibration damping, sound transmission loss, structural separation, etc. at a lower weight relative to a monolithic structural component formed of a monolithic metal sheet material. The laminate sheet 200, including adhered regions 90 having a laminate structure 100, is formable into a structural component 300 which provides desired levels of vibration damping, sound transmission loss, etc. at a lower weight relative to a structural component formed from a monolithic metal sheet, and without requiring added treatments, such as sound dampening coatings or patches, to achieve the desired NVH performance. A structural component, as that term is used herein, refers to a component formed from sheet material which has a complex shape, e.g., a shape other than flat sheet, and is used in a structural application. For example, the complex shape of a structural component 300 can be defined by one or more mechanically formed structural features 81 (see FIG. 18), such as one or more of a bend, rib, aperture, bead, offset, chamfer, depression, channel, curve, contour, extruded portion, or other feature mechanically formed into the laminate sheet 200 to define the structural component 300, where the formed structural features can increase the stiffness and/or rigidity of the component 300. In the example shown in FIGS. 19 and 20, the laminate structural component 300 further includes welded structural features 79 defined by welds 86A formed in non-adhered regions 84A, where the welded structural features 79 increase one or more of the stiffness, rigidity and bending strength of the laminate structural component 300. The laminate sheet 200 having one or more adhered regions 90 including a core layer 10, which can be a viscoelastic and/or an acoustic core layer 10, can be formed into a laminate structural component 300 where there is a particular need for noise dissipation, vibration and/or sound damping, thermal insulation and/or acoustic absorption, for example, between spaces or areas separated by the structural component 300 formed of the laminate sheet 200. The term "structural component" is non-limiting, such that a structural component can include components which have nominal or minimal load bearing requirements. In a non-limiting example, the laminate sheet 200 described herein is formable into structural components 300 for vehicle applications, such as close-out panels, also known as dash panels or trunk panels, which provide structure to the vehicle by separating, respectively, the engine compartment or trunk compartment from the passenger compartment. Other non-limiting examples of vehicle structural components 300 which may be formed from the laminate sheet 200 include wheel well liners, powertrain tunnel covers, floor pans, etc.

In an illustrative example, the metal-based material forming the metal sheets 12, 14 is an aluminum-based material, such as a 5xxx and/or a 6xxx series aluminum alloy. By way of non-limiting example and referring to FIG. 1, the thickness T1, T2 of each aluminum sheet 12, 14 is in the range of 0.4 mm to 2.0 mm. In a preferred example, the thickness T1, T2 of each aluminum sheet 12, 14 is in the range of 0.5 to 1.0 mm. In a more preferred example, the thickness T1, T2 of each aluminum sheet 12, 14 is within the range of 0.6 mm to 0.8 mm. The thickness T1, T2 of the aluminum sheets 12, 14 may be, but is not required to be, the same thickness. For example, the thickness T1 of aluminum sheet 12 may differ from the thickness T2 of aluminum sheet 14 as required by a particular use of the laminate structure 100, and/or as required to form a particular component from the laminate structure 100 and/or to provide functional characteristics such as strength, stiffness, etc. required by the particular component formed from the laminate structure 100. The combined (total) thickness of the aluminum sheets 12, 14 and the core 16 is controlled such that the laminate structure 100 is characterized by an n value (strain hardening exponent) of at least 0.1, an r value (Lankford value) of at least 0.8, an adhesive strength in the adhered region 90, as measured by T-peel, of at least 10 pounds-force/inch, and a lap shear strength of at least 2 mega-Pascal such that the laminate sheet 200 is formable into structure components by stamping, bending, extrusion and like mechanical forming methods without separation of the core 16 from the aluminum sheets 12, 14 or fracturing of the aluminum sheets 12, 14. The examples are illustrative and non-limiting, and it would be understood that one of the aluminum sheets 12 could be a different aluminum material, temper, and/or thickness than the other aluminum sheet 14.

The core layer 10 is applied to selective areas on the metal sheets 12, 14 to define one or more adhered regions 90. The metal layer 12, the metal layer 14 and the core layer 10 disposed therebetween is laminated to form a laminate structure 100 (see FIGS. 1-4) in each adhered region 90, thereby forming a laminate sheet 200 (see examples shown in FIGS. 5, 13 and 17) which includes at least one adhered region 90 and one or more non-adhered regions 84. The non-adhered regions 84 are characterized by a gap 62 between the first and second metal layers 12, 14, and by an absence of the core layer 10 in the gap. Referring to FIGS. 1-4, the laminate structure 100 includes a core layer 10, which includes a core 16 that substantially defines and/or provides the NVH (noise, vibration, harshness) and damping performance characteristics of the laminate structure 100. The core layer 10 and/or the core 16 has sufficient adhesive properties to attach the two metal sheets 12, 14 to each other in the adhered region 90. In one example, the core 16 has viscoelastic properties such that the core layer 10 dissipates vibrational energy by converting the vibrational energy into thermal energy through internal shearing of the core material, and such that the core layer 10 and/or the core 16 acts as a damping layer to damp sound power introduced on a source side of the laminate sheet 200 relative to the sound power transmitted from a receiver side of the laminate sheet 200. In a non-limiting example of an automotive structural component 300 formed from the laminate sheet 200, such as an automotive body panel, dash panel, trunk panel, floor pan, engine tunnel cover, wheel well liner, etc., the noise or source of the sound may be road noise, powertrain or driveline noise, noise from an engine or trunk compartment, aerodynamic noise from the exterior of the vehicle, etc., exerting a sound power on the exterior facing side (relative to the vehicle) of the structural component 300, such that the received sound power is the power of the sound sensed in the interior of the vehicle, e.g., by a passenger in the vehicle, where the receiver side of the structural component 300 is that side which is inwardly facing (relative to the vehicle), i.e., the interior side of the vehicle component 300.

Referring again to FIG. 1, in a non-limiting example, the core 16 contributes to the NVH performance of the laminate sheet 200 by acting as a damping layer in the laminate structure 100 formed in the adhered regions 90 and attaching the aluminum sheets 12, 14 to each other. The core 16 acts as the damping layer by changing sound energy into heat via shear action of the core material forming the core 16, and also acts to hold the aluminum sheets 12, 14 together during and after forming of a structural component 300 from the laminate sheet 200. The core 16 may be formed of a polymeric material which by way of non-limiting example can be an acrylic, polyester and/or polyacrylate material. The core 16 can be formed of a phenolic, rubber, and/or urethane based material. In a non-limiting example, the core 16 can be formed of a combination of two or more of core materials including two or more of an acrylic, polyester, polyacrylate, phenolic, rubber and/or urethane based material. In a preferred example, the core 16 is formed of a viscoelastic material such as a phenolic modified rubber adhesive, a rubber phenolic blend, or a rubber-based viscoelastic material. In other examples the core 16 is formed of one of an acrylic material, an acrylic rubber hybrid material, a polyester material including a cross-linking agent, a rubber phenolic material, a polyester rubber phenolic material, a polyacrylate material, a polyester-based acrylic material, and a rubber phenolic blend. The core 16 may be selectively applied in the adhered regions 90 of the aluminum sheets 12, 14 to provide a dry film thickness (DFT), e.g., an adhesive thickness T3 shown in FIG. 1. In an illustrative example, the adhesive thickness T3 of the core 16 is within the range of 0.0005 inches to 0.0030 inches (approximately 0.013 millimeters (mm) to 0.076 mm), where the damping performance of the laminate structure 100 and the thickness T3 of the core 16 are inversely related, e.g., the damping performance of the laminate structure 100, expressed in one example as a composite loss factor of the laminate structure 100, improves as the thickness T3 of the core 16 is decreased. In a preferred example to achieve the desired damping performance of the laminate structure 100, the thickness T3 of the core 16 is within the range of 0.001 inches to 0.0020 inches (0.025 mm to 0.0508 mm).

Figure 2:
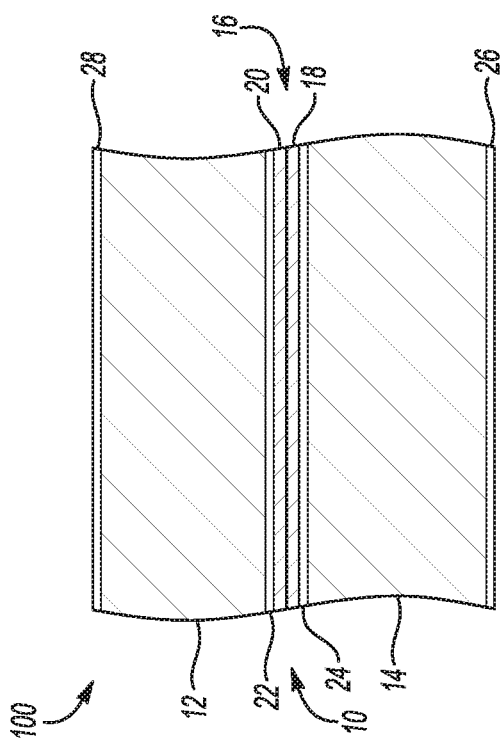
FIG. 2 is a schematic view of a cross-section of a second example laminate structure including a core layer disposed between metal sheets.

The core material forming the core 16 may be selectively applied only to the adhered region(s) of one of the aluminum sheets 12, 14 in a single layer, prior to laminating the aluminum sheets 12, 14 together with the core 16 therebetween to form the laminate sheet 200 including the adhered region(s) 90 and non-adhered region(s) 84. In one example, the core material forming the core 16 may be applied to the adhered region 90 in two core layers 18, 20, as shown in FIG. 2, to form the core 16. In this example, the bond strength and/or peel strength of the laminate structure 100 including the first and second core layers 18, 20 bonded to each other is substantially higher relative to a laminate structure 100 having a core 16 formed from a single layer of core material applied to one of the aluminum sheets 12, 14, prior to laminating. The thickness of each of the two core layers 18, 20 is controlled to provide the desired total dry film thickness T3 of the core 16 in the finished laminate structure 100. In a preferred example, the ratio of the combined thickness (T1+T2) of the aluminum sheets 12, 14 to the thickness T3 of the core 16 is within the range of 25 to 50, where it would be understood that the thickness T1, T2 of the aluminum sheets 12, 14 substantially contributes the tensile strength and rigidity to the laminate structure 100, and the thickness T3 of the core 16 substantially contributes to the damping characteristics of the laminate structure 100. It would be understood that a thinner core 16 is desirable to contribute damping to the laminate structure 100 while minimizing impact on rigidity and tensile strength of the laminate structure 100.

The core material of the core layers 18, 20 may be, in a non-limiting example, one of a polyester based material, an acrylic based material, and a phenolic modified rubber. The core material may be applied to the aluminum sheet 12, 14 by any suitable technique, including, for example, spraying, hot melt and/or rolling techniques, by which the core material is selectively applied to at least one of the aluminum sheets 12, 14, in only the adhered regions 90, at the desired thickness, and such that no core material is applied to the non-adhered regions 84. In another example, the core material may be provided as a dry adhesive film applied to one or both of the aluminum sheets 12, 14 prior to laminating, where the dry adhesive film is applied only to the adhered regions 90 and is not applied to non-adhered regions 84 of the laminate sheet 200. The core material is heated and/or cured during the laminating process forming the laminate structure 100 by a means suitable to the type of the core material being applied, which may include one or a combination of exposing the aluminum sheets 12, 14 and/or the core material to elevated temperatures, for example, using flame bars, incinerator ovens, hot air ovens, and/or hot melt, infrared, and/or ultraviolet systems, etc., as understood by those knowledgeable in the field of laminating. The examples are non-limiting, and it would be understood that other forms of core materials such as dry powder or web forms, and other application methods and curing processes may be used within the scope of forming the laminate structure 100 within the adhered regions 90 of the laminate sheet 200 described herein.

The core material forming the core layer 10 and/or the core 16 is characterized by an elongation which is substantially greater than the elongation of the aluminum material comprising the aluminum sheets 12, 14, such that during deformation of the laminate structure 100, for example, during stamping, extrusion, and/or bending of the laminate sheet 200 to form a component therefrom, the core layer 10 remains in an elastic range and does not separate from the aluminum sheets 12, 14 at core edges 50 of the adhered region 90, and/or from the aluminum sheets 12, 14 within the adhered region 90, where it would be understood that separation of the core 16 from the aluminum sheets 12, 14 would affect the damping characteristics of the laminate structure 100 in the localized area where the separation occurred. By way of non-limiting example, the core layer 10 and/or the core 16 is characterized by a minimum elongation of 150%. In a preferred example, the core layer 10 and/or the core 16 is characterized by a minimum elongation of 300%, and in a more preferred example, an elongation in the range of 300% to 400%. Preferably, a minimum elongation ratio of ten (10) is maintained for the laminate structure 100, where the elongation ratio is expressed as the elongation of the core layer 16 relative to (divided by) the elongation of the thinner of the aluminum sheets 12, 14, to prevent fracture of the core layer 16 and maintain the damping capacity of the laminate structure 100. In a more preferred example, the laminate structure 100 is characterized by a minimum elongation ratio of twenty (20). In a most preferred example, the laminate structure 100 is characterized by a minimum elongation ratio in the range of twenty (20) to thirty (30).

In a preferred example for forming the core layer 10 and laminate structure 100, a core material is selected, applied to one or both of the aluminum sheets 12, 14, cured and laminated to provide a laminate structure 100 which is characterized by an adhesive strength as measured by T-peel of at least ten pounds-force/inch (10 lbf/in or approximately 1.75 Newtons/millimeter (N/mm)) using a T-peel strength test performed for example, in compliance with ASTM D1876 at a 10 inch/minute pull rate, a lap shear strength of at least two mega Pascal (2 MPa) a lap shear strength test performed for example, in compliance with ASTM D1002, a yield strength of 100-120 kilo-pounds per square inch (KSI) with an ultimate tensile strength of 200-250 KSI where plastic failure of at least one of the aluminum sheets 12, 14 occurs prior to plastic failure of the core 16. In a most preferred example, the laminate structure 100 is characterized by an adhesive strength as measured by T-peel of at least fifteen foot-pounds/inch (15 lbf/in or approximately 2.63 N/mm).

In a preferred example, the laminated structure 100 retains a minimum of 80% of the original bond strength, as indicated by lap shear strength and T-peel strength, after heat cycle aging, after thermal cycle (cold shock or cold/hot thermal cycling testing, for example, between −30 degrees C. and +105 degrees C.) testing, and after cyclic corrosion testing (for example, SAE J2334 testing), where the criteria for each of these is application specific for the intended use of the laminate structure 100 or a component formed therefrom. In one example, the laminate structure 100 is characterized by retaining 80% of the original bond strength after being subjected to heat cycle aging at 205 degrees Celsius for 40 minutes, to provide a laminate structure 100 which can be subjected during a coating process cycle such as electro-coating (electrostatic coating or E-coat) cycle or painting cycle to a baking operation where the laminate structure 100 is heated in a paint or e-coat oven in excess of 100 degrees Celsius and up to 205 degrees Celsius, without degradation of the laminate structure 100 or component formed therefrom. For example, a laminate sheet 200 including such a laminate structure 100 is suitable for forming into an automotive component such as a dash panel, etc., which may be e-coated or painted. In the preferred example, the laminate structure 100 is able to withstand a 90 degree 1T radius bend at 0.75 inch flange length without degradation, where T is the thickness of the laminate structure 100 expressed in inches, where in the present example the laminate structure 100 includes aluminum sheets 12, 14 made of 5xxx series aluminum material and a core 16 made of phenolic modified rubber, the laminate structure 100 having a total thickness of approximately 0.072 inches. The laminate structure 100 of the present example in an Olsen dome tensile test can be pressed by a 1 inch ball to a depth of 0.360 inches prior to rupture, e.g., prior to fracture of the aluminum sheet 12, 14. In a preferred example, a laminate structure 100 includes aluminum sheets 12, 14 made of 5xxx series aluminum material with an "O" temper to provide high elongation with relatively low tensile strength such that minimal springback occurs during and after forming of a component from the laminate structure 100, e.g., such that the laminate structure 100 exhibits forming characteristics similar to a deep draw grade ferrous material.

The laminate structure 100 exhibits a bending rigidity at room temperature (approximately 23 degrees Celsius) which is at least 35% that of a solid (monolithic) aluminum sheet having a thickness equal to the combined thickness (T1+T2) of the aluminum sheets 10, 12. In a preferred example, the laminate structure 100 exhibits a bending rigidity at room temperature of 50% or more relative to a monolithic aluminum sheet having a thickness equal to the combined thickness (T1+T2) of the aluminum sheets 10, 12. In a more preferred example, the laminate structure 100 exhibits a minimum bending rigidity at room temperature of 50% to 60% of that of a monolithic aluminum sheet having a thickness equal to the combined thickness (T1+T2) of the aluminum sheets 12, 14.

As shown in FIG. 1, the core layer 10 may include one or more intermediate coating or treatment layers 22, 24 which may be referred to herein as intermediate layers 22, 24. In the example shown, a first intermediate layer 22 is disposed between the core 16 and the aluminum sheet 12 such that the intermediate layer 22 spans substantially the entirety of (i.e., is coextensive with) the core 16, and a second intermediate layer 24 is disposed between the core 16 and the aluminum sheet 14 such that the intermediate layer 24 spans substantially the entirety of (i.e., is coextensive with) the core 16. The example shown in FIG. 1 is non-limiting, and it would be understood that the laminate structure 100 may be constructed including both of the intermediate layers 22, 24, one of the intermediate layers 22, 24, or neither of these, and that the intermediate layers 22, 24 can be coextensive with the respective aluminum sheet 12, 14. The intermediate layer 22, 24 prepares the surface of the respective aluminum sheet 12, 14 to which it is applied, to passivate the surface of the aluminum sheet 12, 14 to increase the surface bonding potential of the respective aluminum sheet 12, 14 to bond with the core material of the core 16, and/or to resist corrosion at the bond interface between the core 16 and the respective aluminum sheet 12, 14 to prevent degradation of the bond between the core 16 and the respective aluminum sheet 12, 14, for example, by preventing formation of a corrosion product at the bond interface.

The aluminum sheet 12, 14 may be prepared, e.g., pretreated, prior to applying the intermediate layer 22, 24 by cleaning the aluminum sheet 12, 14 with a deoxidation cleaner such as an alkaline cleaner or an acidic cleaner to remove soil, oil, grease, etc. from the surface of the aluminum sheet 12, 14 and to remove any aluminum oxide product from the surface of the aluminum sheet 12, 14, to prepare the surface of the aluminum sheet 12, 14 to receive the intermediate layer 22, 24. As such, the deoxidation cleaner creates a "fresh" aluminum surface which, if not subsequently treated, e.g., coated, within a period of time, will reoxidize. As such, the deoxidation cleaner removes the oxide layer from surface of the aluminum sheet 12, 14 to temporarily increase bonding receptivity of the aluminum sheet, for example, to one of the layers 22, 24, 30, 32 described further herein. In a non-limiting example, the aluminum sheet 12, 14 may be cleaned and/or pretreated applying the cleaning solution using, for example, immersion cleaning, spray cleaning, rolling on the cleaning solution, or using other suitable chemical cleaning means to apply the deoxidation cleaner. In another example, the aluminum sheet 12, 14 may be mechanically cleaned to deoxidize, e.g., remove the oxide layer from, the surfaces of the aluminum sheet 12, 14.

In one example, the intermediate coating 22, 24 may be applied by spraying the intermediate coating 22, 24 in solution form onto the aluminum sheets 12, 14 or immersing the aluminum sheets 12, 14 in the coating solution. In one example, the intermediate coating 22, 24 is applied as a solution containing titanium and zirconium which passivates the aluminum surface of the aluminum sheet 12, 14, and prevents activation of the aluminum surface over time. In another example, the intermediate coating 22, 24 is applied as a solution containing tri-chromium oxide. The coating solution may also be applied to the exterior surfaces, e.g., the outwardly facing surfaces, of the aluminum sheets 12, 14 to form exterior coating layers 28, 26, as shown in FIG. 2, to passivate and/or increase the surface bonding potential of the exterior (outwardly facing) surface of the aluminum sheet 12, 14, as a pretreatment for further coating and/or painting of the laminate structure 100 or a component formed therefrom, and/or to provide a corrosion prevention coating 26, 28 on the laminate structure 100.

Figure 3:
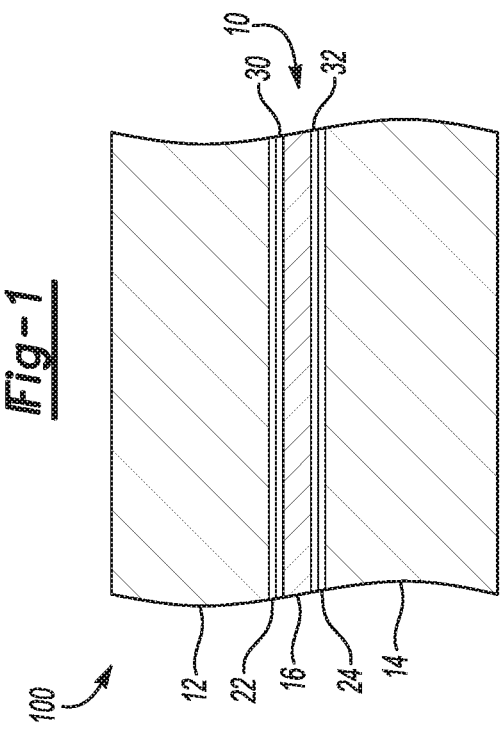
FIG. 3 is a schematic view of a cross-section of a third example laminate structure including a core layer disposed between metal sheets.

As shown in FIG. 3, an auxiliary coating layer 30, 32 may be applied between the intermediate layer 22, 24 and the core layer 16 such that the auxiliary coating layer 30, 32 spans substantially the entirety of (i.e., is coextensive with) the core layer 16. Each of the auxiliary coating layers 30, 32 may also be referred to herein as an auxiliary layer 30, 32. In one example, the auxiliary layer 30, 32 may be a titanium and zirconium containing coating similar to the passivation layer 22, 24, such that the laminate structure 100 includes first and second layers 22, 30 between the core 16 and the aluminum sheet 12 and first and second layers 24, 32 between the core 16 and the aluminum sheet 14, where the dual layering of the titanium-zirconium containing layers 22, 30 and 24, 32 first passivates the aluminum surface then increases the receptivity of bonding of the core 16 to the aluminum sheet 12, 14. The increased receptivity provided by the dual layering increases the bond strength at the bond interface between the core 16 and the aluminum sheet 12, 14 resulting in a relatively higher peel strength, for example, greater than 10 lbf/in, while retaining the desired damping performance, for example, a CLF of greater than 0.1 within +/−10 degrees Celsius of the target operating (in use) temperature of the laminate structure 100 and/or a component formed therefrom.

In one example, the laminate structure 100 may include at least one of the auxiliary layer 30, 32 which is a corrosion prevention layer to prevent contaminant ingression at the bonded interface between the core 16 and the adjacent aluminum sheet 12, 14, for example, by preventing contaminant ingression at an exposed edge of the laminate structure 100. In another example, the laminate structure 100 may include at least one auxiliary layer 30, 32 configured as a thermal coating to modify the thermal emissivity and/or thermal conductivity of the laminate structure 100. For example, at least one auxiliary layer 30, 32 may be made of a heat dissipating material to dissipate heat away from the core 16, or may be made of a heat absorptive material to absorb heat into the laminate structure 100. The example shown in FIG. 3 is non-limiting, and it would be understood that the laminate structure 100 may be configured with one or both auxiliary layers 30, 32, with a plurality of auxiliary layers 30 disposed between the core 16 and the aluminum sheet 12, with a plurality of auxiliary layers 32 disposed between the core 16 and the aluminum sheet 14, and/or without either auxiliary layer 30, 32. It would be understood that each of the auxiliary layers 30, 32 may be similarly configured, e.g., be made of the same material and/or have the same thickness, or may be differently configured, e.g., made of different materials and/or have different thicknesses and/or be included to provide different functionalities (corrosion prevention, thermal conductivity, etc.) to the laminate structure 100.

Referring to FIG. 2, the laminate structure 100 may include one or more exterior coating layers 26, 28, which may be referred to herein as exterior coatings 26, 28 and/or as exterior layers 26, 28. In the example shown, an exterior layer 28 is applied to, e.g., bonded, adhered, laminated or otherwise attached to, the exterior (outwardly facing or outermost) surface of the aluminum sheet 12 such that the exterior layer 28 spans substantially the entirety of (i.e., is coextensive with) the aluminum sheet 12, and an exterior layer 26 is applied to, e.g., bonded, adhered, laminated or otherwise attached to the exterior (outwardly facing or outermost) surface of the aluminum sheet 14 such that the exterior layer 28 spans substantially the entirety of (i.e., is coextensive with) the aluminum sheet 12. The example shown in FIG. 2 is non-limiting, and it would be understood that the laminate structure 100 could be configured with one, both, or neither of the exterior layers 26, 28. The exterior coating layers 28, 26 may be configured to passivate and/or increase the surface bonding potential of the exterior (outwardly facing) surface of the aluminum sheet 12, 14, as a pretreatment for further coating and/or painting of the exterior surfaces of the laminate structure 100 or a component formed therefrom, and/or to provide a corrosion prevention coating 26, 28 on the laminate structure 100. The laminate structure 100 can include a plurality of exterior layers 26 and/or a plurality of exterior layers 28 applied in a predetermined sequence. By way of non-limiting example, the laminate structure 100 could include a first exterior layer 28 applied to, e.g., bonded, to the aluminum sheet 12, as a pretreatment for further coating and/or painting of the exterior (outwardly facing) surface of the aluminum sheet 12 with an additional exterior layer 28 which may be, by way of non-limiting example, a paint layer, a decorative coating layer, a corrosion protection layer, a thermal coating layer, etc. In one example, the exterior layer 26, 28 is a heat reflective thermal coating layer, such as a solar reflective layer, to reflect heat from and/or decrease heat absorption into the laminate structure 100. In another example, the exterior layer 26, 28 is a heat absorptive thermal coating layer, such as a low emissivity coating layer or black paint layer, to increase heat absorption into the laminate structure 100.

Figure 4:
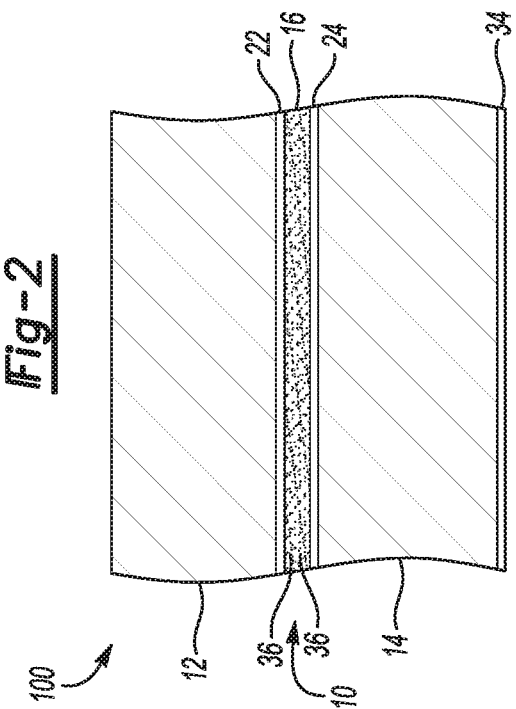
FIG. 4 is a schematic view of a cross-section of a fourth example laminate structure including a core layer disposed between metal sheets.

In one example, at least one of the exterior layers 26, 28 may be configured as an isolation layer 34, as shown in FIG. 4, where an "isolation layer" as that term is used herein, is a layer of material bonded to the metal sheets 12, 14 to form an exterior layer 26, 28 of the laminate structure 100, and configured to prevent corrosion of the laminate structure 100 and/or to protect the metal sheets 12, 14 to which the isolation layer 34 is applied, for example, from chemical attack and/or exposure to contaminants. In one example, the isolation layer 34 is configured to prevent galvanic corrosion when the laminate sheet 200 and/or a structural component 300 formed therefrom is in contact with, connected and/or fastened to another component 98 (see FIGS. 8, 10, 20), which may be a metal component such as an aluminum or steel component. The isolation layer 34 may also be referred to herein as a galvanic isolation layer 34. In one example, the galvanic isolation layer 34 can consist of a polymer binder with zinc particles disbursed and embedded therein, with the polymer layer preventing corrosion by preventing ion transfer through the isolation layer, and the zinc particles preferentially, e.g., sacrificially, absorbing ions to prevent corrosion of the aluminum sheet 12, 14. The examples shown in the figures are non-limiting. For example, an exterior layer 26, 28 may be disposed between the aluminum sheet 14, 12 and a galvanic isolation layer 34.

Referring to FIG. 4, the core 16 can be a composite core 16, including filler particles 36 distributed in the core material forming the core 16. The size, shape, configuration, material, density and dispersion pattern of the filler particles 36 may be selected to provide a desired functional attribute of the core layer 10 and/or the core 16. In one example, the core 16 is a phenolic modified rubber including a plurality of rubber filler particles 36. The phenolic bonds with the aluminum sheets 12, 14 and the rubber particles bond to the phenolic, to contribute bond strength and peel strength to the laminate structure 100. In another example, the filler particles 36 may be configured to modify the thermal conductivity of the laminate structure 100. In one example, the filler particles 36 may be configured to increase the insulating characteristics of the laminate structure. In another example, the filler particles 36 may comprise a thermal conductivity material to increase the thermal dissipation from a point or localized source of the laminate structure 100, for example, when the laminate structure 100 is intended for use in a heat shielding application and thermal dissipation of heat away from the area being shielded by the laminate structure 100 is required.

By way of non-limiting example, a method of forming the laminate sheet 200, having at least one adhered region 90 defined by the laminate structure 100 and at least one non-adhered region 84 defined by an absence of the core layer 10 between the first and second metal sheets 12, 14, includes presenting the various layers required to form the laminate sheet 200 in the required sequence and configuration to a laminating process which applies a laminating pressure to the sequenced layers and cures the layered structure such that the layers are bonded together to form the laminate sheet 200 including the adhered regions 90 defined by a laminated structure 100. By way of non-limiting and illustrative example and referring to FIG. 2, the laminate structure 100 is formed by cleaning the metal sheets 12, 14, as previously described herein, to deoxidize the surfaces of the metal sheets 12, 14. In one example, the inwardly facing surfaces of the metal sheets 12, 14, e.g., the surfaces which are to be bonded to the core 16, can be respectively coated with the intermediate layers 22, 24. In one example, a coating material may be applied to the exterior (outwardly facing) surfaces of the aluminum sheets 12, 14 to form the exterior layers 28, 26, for example, by spray, roller and/or immersion application, and wetted out, e.g., distributed, on the outwardly facing surfaces of the aluminum sheets 12, 14.

In another example, the laminate structure 100 may be laminated without one or both of the exterior layers 28, 26, and/or one or both of the exterior layers 28, 26 may be applied to the laminate structure 100 after lamination and curing of the laminate structure 100, for example, as a paint or e-coat layer, or an isolation layer 36, as previously described herein.

Still referring to FIG. 2, in the example shown, the core material forming the core 16 is applied in two layers 18, 20, where the core layer 18 is applied to the intermediate layer 22 and the core layer 20 is applied to the intermediate layer 24. The example is non-limiting, and the core material may be applied in a single layer or in multiple layers, for example, by spraying or rolling, or as a dry adhesive film, and subjected to a drying and/or curing operation. The applied core material is selectively distributed such that the core material covers only the adhered regions 90 of the aluminum sheet 12, 14, at a uniform coating thickness sufficient to provide the desired thickness of the core 16 after laminating and curing the laminate structure 100. The core material is not applied to the non-adhered regions 84, 84A of the metal sheets 12, 14, such that after laminating to form the laminate sheet 200, the non-adhered regions 84, 84A are characterized by an absence of core material between the metal sheets 12, 14 and the metal sheets 12, 14 in the non-adhered regions 84, 84A are separated by a gap 62 therebetween. The metal sheets 12, 14 with the core layer 16 disposed therebetween are laminated and cured to form the laminate sheet 200 including at least one adhered region 90 and at least one non-adhered region 84, 84A.

Following the lamination process, e.g., after laminating and curing the sequenced layers forming the laminate structure 100, the laminate sheet 200 may be subjected to additional treatments, including, as previously described herein, the application of one or more of the exterior layers 26, 28, 34. The laminate sheet 200 may be subsequently formed by one or more forming operations such as cutting, stamping, pressing, bending, extruding, punching, drilling, etc. to form a component, which may be a laminate structural component 300 having one or a combination of one or more holes, apertures, slots, and one or a combination of one or more formed structural features 81 such as bends, fillets, chamfers, shoulders, openings, ribs, flanges, hems, etc. By way of non-limiting example, the laminate sheet 200 may be used to form a variety of laminate structural components 300 which may be used in vehicles, such as a dash panel, package tray, panel shelf, seat panel, cowl panel, instrument panel frame, floor panel, tunnel panel, wheel well, back-up panel, trunk panel, etc. The examples are non-limiting, and it would be understood that various components which may be structural or non-structural components, may be formed using the laminate sheet 200 described herein.

The laminate sheet 200 and/or a structural component 300 formed therefrom may be fastened to another component 98 (see FIG. 20) by use of various means of attachment, including, for example, one or a combination of one or more of adhesive fastening, mechanical fastening, and joining by welding or brazing. In one example, an adhesive, such as a structural adhesive, can be used to bond the laminate sheet 200 and/or a structural component 300 formed therefrom to another component 98. In another example, a mechanical means of attachment, using a fastener 77 (see FIG. 21) such as a rivet, bolt, clamping element, crimping element, etc. may be used to fasten the laminate sheet 200 and/or a structural component 300 formed therefrom to another component 98, where the fastener 77, e.g., the rivet, bolt, etc. is attached via an opening, such as a hole or slot, formed in the laminate sheet 200, where the opening formed in the laminate sheet 200 to receive the fastener can be formed in an adhered region 90 and/or in a non-adhered region 84, 84A of the laminate sheet 300. By way of non-limiting example, the fastener may be a rivet such as a pop rivet, self-piercing rivet, Henrob™ rivet, blind rivet, etc. In another example, the fastener may be a bolt, which may be a standard bolt, a lock bolt, a Huck bolt, etc. In another example, the fastener may be a clamping element or crimping element which is tightened or distorted in contact with the laminate sheet 200 to attach the laminate sheet 200 to another component 98, where the clamping or crimping element may be tightened around a portion of the laminate sheet 200 including but not limited to a non-adhered region 84 of the laminate structure 100. In the non-limiting examples shown in FIGS. 21-26, one or more fasteners 77 can be installed in a non-adhered region 84 to form a fastened structural feature 45, which can be used for localized strengthening and/or stiffening of the laminate sheet 200, as further described herein.

Figure 8:
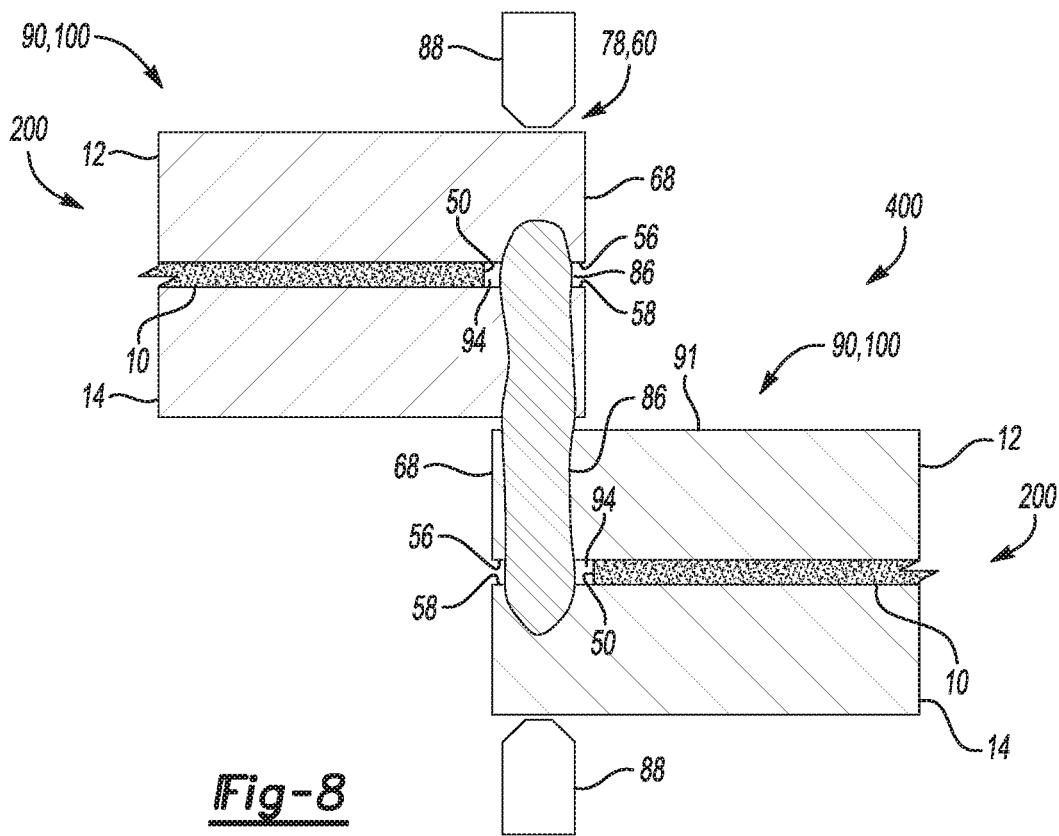
FIG. 8 is a schematic cross-sectional view showing a weld portion of the weldable margin of laminate sheets are overlapped, during a first example welding operation to form a weld in the overlapping weld portions of the laminate sheets.

In the illustrative examples shown in FIGS. 8-10 and FIG. 20, the laminate sheet 200 and/or a structural component 300 formed therefrom may be attached to another component 98 by welding, e.g, by forming a weld between a non-adhered region 84 of the laminate sheet 200 and the component 98 to which the laminate sheet 200 is attached. The laminate sheet 200 as described in the present example is suitable for attachment by welding to another component or structure using, for example, resistive spot welding, cold metal transfer welding also known as cold metal fusion welding, delta strip welding also known as continuous strip welding, etc. The other component 98 can be, as shown in FIG. 8, another laminate sheet 200 or laminate structural component 300 formed therefrom, where the laminate sheets 200 are joined by forming a weld joining the non-adhered regions 84 of the laminates sheets 200. In another example shown in FIGS. 9-10 and 20, the other component 98 can be a monolithic metal component.

Referring now to FIGS. 5-17, a laminate sheet 200, a method of forming the laminate sheet 200, and a method of welding the laminate sheet 200 or a structural component 300 formed therefrom to another component 98 is provided. As shown in the examples, the laminate sheet 200 includes at least one adhered region 90 and at least one non-adhered region 84, as further described herein, where each of the non-adhered regions 84 defines a weldable margin 60. The non-adhered region 84 and weldable margin 60 is characterized by a gap 62 (FIG. 7) between the portions of the metal sheets 12, 14 forming the non-adhered region 84, and further characterized by an absence of the core layer 10 in the gap 62. Referring to FIGS. 5-7 and 11-17, the laminate sheet 200 includes a core layer 10 which is selectively formed in only a portion of the laminate sheet 200 during the lamination process, to define at least one adhered region 90 and to further define one or more non-adhered regions 84 in the remaining portions of the laminate sheet 200, where the non-adhered regions 84 are characterized by an absence of the core layer 10. As such, the adhered region 90 is defined by the core layer 10 and a laminate structure 100 including the core layer 10, where the laminate structure 100 can be configured as previously described herein related to FIGS. 1-4. The non-adhered region 84 is defined by a gap 62 (FIG. 7) between inner surfaces 56, 58 (FIG. 7) of the first and second metal sheets 12, 14, and by the absence of the core layer 10 in the non-adhered region 84, such that the first and second metal sheets 12, 14 are not adhered to each other in the non-adhered region 84.

Due to the absence of the core layer 10 in the non-adhered region 84, the laminate sheet 200 is advantaged during welding of the laminate sheet 200, or a structural component formed therefrom, to another component 98 (FIGS. 8-10), by forming welds 86 in a weld portion 78 of the weldable margin 60 to join the laminate sheet 200 to the component 98, where the welds 86 formed in the weld portion 78 do not extend into the core layer 10, e.g., are not in contact with the core edge 50, such that the core layer 10 remains separated from the weld 86 and/or remains substantially unaffected by heat generated during formation of the weld 86. In another example shown in FIGS. 17-20, and described in further detail herein, one or more welded structural features 79 can be added to a laminate structural component 300, where the welded structural feature 79 is made by welding a weld 86A in a non-adhered region 84A of the laminate structural component 300, to join the first and second metal sheets 12, 14 in the non-adhered region 84A, for example, to increase the stiffness, rigidity, and/or bending strength of the structural component 300, without increasing the packaging space consumed by the structural component 300. By preferentially forming the welds 86, 86A within the weldable margin 60, e.g., within the non-adhered region 84, 84A, heat transfer to the core layer 10 from the heat affected zone generated in the laminate sheet 200 during welding to form the weld 86 is minimized and/or negligible, such that vaporizing and/or liquefying of the core layer 10 is prevented. As such, the core edge 50 and the core layer 10 adjacent the weld 86 remains intact, the adhesive and sound dampening properties of the laminate structure 100 adjacent the weld 86, 86A remains intact, and, because the core layer 10 remains intact, contamination of the weld 86, 86A by the materials forming the core layer 10 is avoided. The welded structural feature 79 is preferentially made, e.g., welded, in the non-adhered region 84A after the structural component is formed from the laminate sheet 200, such that the weld 86A comprising the structural feature 79 is not subjected to forming stresses or deformation during forming of the structural component 300. As such, optimal strength of the weld 86A of the welded structural feature 79 is retained to optimize contribution of the welded structural feature 79 to the rigidity, stiffness and/or bending strength of the laminate structural component 300.

Figure 5:
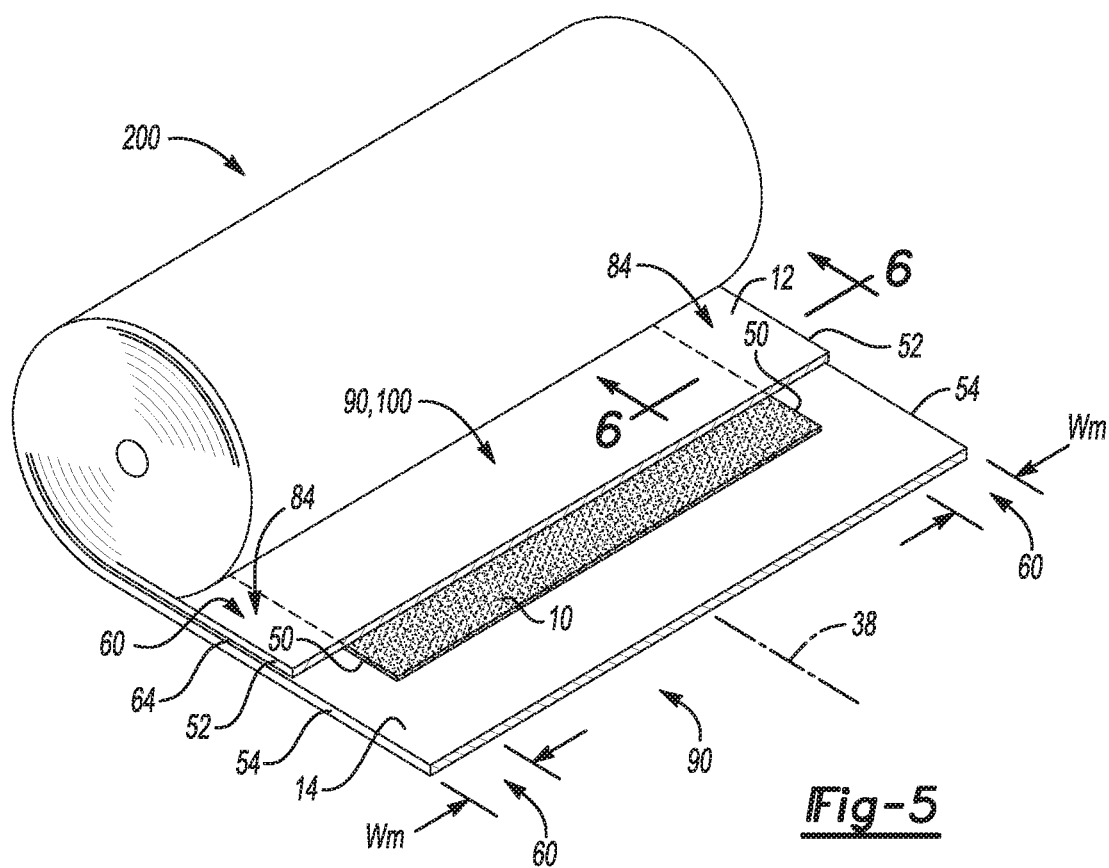
FIG. 5 is a schematic perspective and fragmentary view of a first embodiment of a partly unrolled coil of a laminate sheet including an adhered region having a laminate structure, showing a first metal sheet partially stripped away and a core layer partially stripped away and partially shown in phantom to illustrate a weldable margin formed in a non-adhered region of the laminate sheet.

Referring now to FIGS. 5-10, shown is a first embodiment of a laminate sheet 200 and a method of joining the laminate sheet 200 to another laminate sheet 200 and/or to another component 98 by forming a weld in the non-adhered region 84 of the laminate sheet 200 and the joined component 98. The laminate sheet 200 shown in FIGS. 5-6 includes first and second metal sheets 12, 14 which are laminated together to define an adhered region 90, which in the example shown is central to the laminate sheet 200, and bordered on each core edge 50 by a non-adhered region 84 extending between the core edge 50 and an edge 64 of the laminate sheet 200. The edge 64 of the laminate sheet 200 may also be referred to herein as a laminate sheet edge 64. In the example shown in FIGS. 5 and 6, the first metal sheet 12 includes edges 52 and the second metal sheet 14 includes edges 54. In the example, the first and second metal sheets 12, 14 are substantially the same width and aligned during lamination such that the edges 52, 54 align to define a longitudinal edge 64 of the laminate sheet 200, which may be referred to herein as a laminate sheet edge 64. Each non-adhered region 84 defines a weldable margin 60 adjacent a core edge 50 of the core layer 10. In the example shown in FIGS. 5 and 6, the weldable margin 60 is coextensive with the non-adhered region 84. The weldable margin 60 may also be referred to herein as a margin portion of the laminate sheet 200, or as a margin 60. The margin 60 includes a weld portion 78, which in a non-limiting example is immediately adjacent the core edge 50 (FIG. 6-10). In the example shown in FIG. 5, the non-adhered regions 84 and margins 60 are longitudinal and parallel to a longitudinal axis 38 defined by the laminate sheet 200. The example shown in FIG. 5 is non-limiting, such that the laminate sheet 200 can be formed with various configurations of adhered and non-adhered regions 90, 84 including a plurality of adhered regions 90 and a plurality of non-adhered regions 84 (FIGS. 13-14 and 17).

Figure 6:
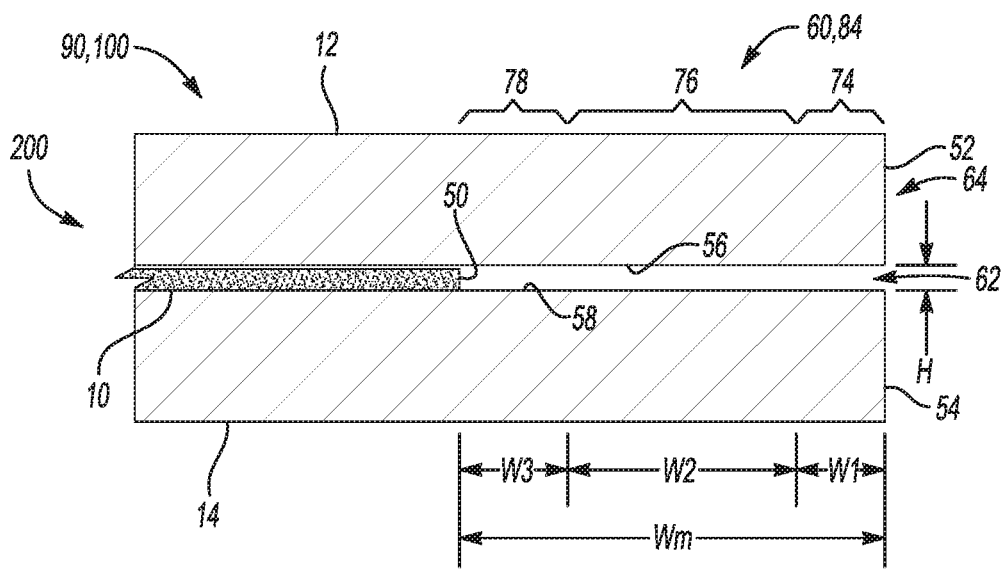
FIG. 6 is a schematic cross-sectional view of section 6-6 of FIG. 5, showing the non-adhered region defining the weldable margin, after forming the laminate sheet of FIG. 5.
Figure 13:
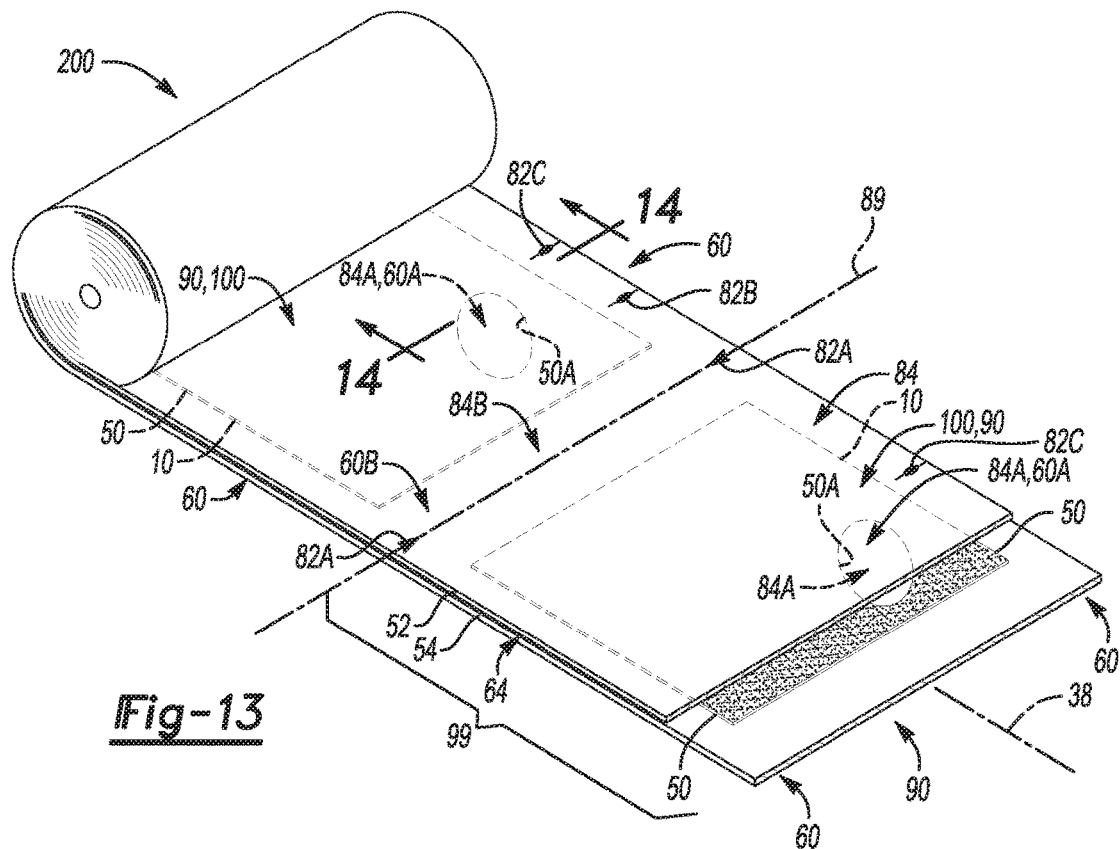
FIG. 13 is a schematic perspective and fragmentary view of a third embodiment of a partly unrolled coil of the laminate sheet, showing the first metal sheet partially stripped away and a core layer partially stripped away and partially shown in phantom to illustrate a weldable margin formed at each edge of the laminate structure and weldable margins formed in non-adhered regions such that each of these are surrounded by an adhered region of the laminate structure.
Figure 14:
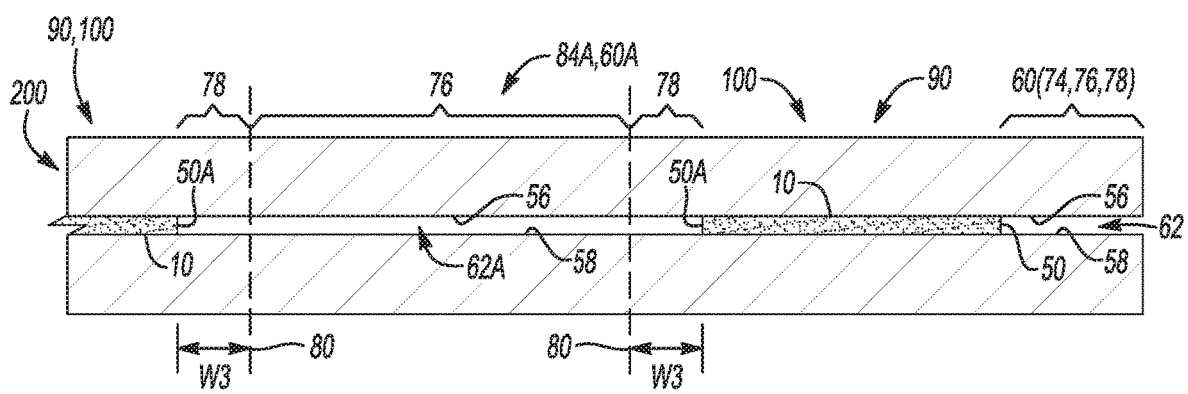
FIG. 14 is a schematic cross-sectional view of section 14-14 of FIG. 13, showing the first weldable margin formed at the edge of the laminate structure and the second weldable margin formed in a non-adhered region bounded by the adhered region of the weldable insert after forming the laminate structure of FIG. 13.

For example, the laminate sheet 200 can include an adhered region 90 bounded by a continuous core edge 50 where the non-adhered region 84 is intermediate the core edge 50 and the laminate sheet edge 64, where in a first example the non-adhered region 84 has a regular shape and is parallel to the longitudinal axis 38 as shown in FIGS. 5 and 6, and in a second example is irregular in shape as shown in FIGS. 13 and 17. In the example shown in FIG. 13, the adhered region 90 may be central to the laminate sheet 200 such that the non-adhered region 84 extends continuously between the core edge 50 of the centrally positioned adhered region 90 and the laminate sheet edge 64. In this example, the laminate sheet 200 includes a plurality of adhered regions 90 bordered by a longitudinal non-adhered region 84 extending from the longitudinal core edge 50 of each adhered region 90 to the laminate sheet edge 64, and a lateral non-adhered region 84B extending laterally between the laminate sheet edges 64 to define a weld margin 60B. This embodiment may be useful, for example, when forming a laminate sheet 200 which is subsequently cut laterally through the lateral non-adhered region 84B along a blanking line 89, as shown in FIG. 13, to provide a sheet blank 99, where the sheet blank 99 includes a central adhered region 90 bordered on each side of the sheet blank 99 by a non-adhered region 84 extending from the core edge 50 to the edge of the sheet blank 99. Additional non-limiting examples include forming the shapes of the adhered and non-adhered regions 90, 84 in regular shapes (FIG. 6), in irregular shapes (FIGS. 13, 17). The adhered and/or non-adhered regions 90, 84 can be symmetrical (FIGS. 6, 11, 15) or asymmetrical (FIGS. 13, 17) relative to a longitudinal axis 38 of the laminate sheet 200. The adhered region 90 can be formed in a repeating pattern, which may be regular or irregular in shape and may be symmetrical or asymmetrical relative to a longitudinal axis 38 of the laminate sheet 200. For example, the adhered regions 90 formed in the laminate sheet 200 shown in FIG. 13 define a pattern which is repeated at intervals along the longitudinal axis 38. For example, the non-adhered region 84A formed in the laminate sheet 200 shown in FIG. 13 is irregular in shape relative to the longitudinal axis 38 and relative to the lateral blanking line 89.

Referring again to FIGS. 5, 11, 13, 15 and 17, a method of forming the laminate sheet 200 includes selectively applying a core material to only a portion of at least one of a first and second metal sheet 12, 14, and laminating the first metal sheet 12 to the second metal sheet 14 such that the core material is disposed between and bonded to the first and second metal sheets 12, 14 to form a laminate sheet 200 including a core layer 10 made from the core material, where the core layer 10 is bounded by a core edge 50. As shown in FIG. 5, the core material is applied only to a portion of the metal sheets 12, 14 such that the core layer 10 formed therefrom is not coextensive with the metal sheets 12, 14. e.g. does not extend to the sheet edges 52, 54 of the metal sheets 12, 14 or to the laminate sheet edge 64 of the laminate sheet 200 formed therefrom. The core material forming the core layer 10 is selectively applied to only a portion of the metal sheet 12, 14, such that after laminating, the laminate sheet 200 includes an adhered region 90 formed on the portion of the laminate sheet 200 where the core material has been selectively applied, and at least one non-adhered region 84 defined by the remaining portion of the laminate sheet 200 where none of the core material has been applied to either of the inner surfaces 56, 58 of the first and second metal sheets 12, 14 (FIG. 6) such that a gap 62 separates the first and second metal sheets 12, 14 in the non-adhered region 84. As such, the adhered region 90 is defined by the laminate structure 100 including the first and second metal sheets 12, 14 and the core layer 10 bonded therebetween, where the core edge 50 of the core layer 10 defines a boundary between the adhered region 90 and the non-adhered region 84 adjacent the adhered region 90, and the non-adhered region 84 is defined by the gap 62 between the first and second metal sheets 12, 14 and an absence of the core material and core layer 10 formed therefrom in the gap 62. The non-adhered region 84 includes a weldable margin 60 adjacent the core edge 50 and characterized by a margin width Wm which is sufficiently wide such that a metal weld 86 (FIGS. 8-10) joining the first and second metal sheets 12, 14 is formable within the weldable margin 60, and such that the core edge 50 is substantially unaffected by heat generated by formation of the weld 86 in the weld margin 60.

In one example, the core material can be applied to at least one of the first and second metal sheets 12, 14 as a dry adhesive film configured to define the adhered region 90. For example, referring to FIGS. 5, 11 and 15, the dry adhesive film may be provided having a predetermined width that when applied centrally to the metal sheet 12, 14 the non-adhered regions 84 at each metal sheet edge 52, 54 do not have any film applied, e.g., are absent of any of the dry adhesive film. For example, referring to FIGS. 13 and 17, the dry adhesive film may be provided having a predetermined pattern or shape which varies in shape along the length of the film such that when applied to the metal sheet 12, 14 the adhered and non-adhered regions 90, 84 are defined by the predetermined shape of the dry adhesive film. In the example shown in FIG. 17, the width of the adhered region 90 varies longitudinally, such that the width of the non-adhered region 84 adjacent the adhered region 90 varies within a range from margin width Wm to width Wx shown in FIG. 17. In another example, the dry adhesive film may be provided in sections as shown in FIG. 13, with each section of film defining a separate adhered region 90, and applied at predetermined locations and/or intervals on at least one of the metal sheets 12, 14 such that each of the separate adhered regions 90 is separated from an adjacent adhered region 90 by a non-adhered region 84B. Each film section may be shaped and/or include one or more openings to define a non-adhered region 84A (FIGS. 13 and 17) within the film section such that after laminating, the non-adhered region 84A is surrounded by an adhered region 90 and is characterized by a gap 62A (FIGS. 14 and 19) between the inner surfaces 56, 58 of the metal sheets 12, 14 within the non-adhered region 84A.

In another example, the core material can be selectively applied to only a portion of the metal sheet 12, 14 to define the adhered region 84 by selectively spraying or rolling the core material onto the metal sheet 12, 14. As described previously herein, the core material may be applied, either as a dry adhesive film or by rolling or spraying, to the first metal sheet 12, to the second metal sheet 14, or to both metal sheets 12, 14 prior to laminating the metal sheets 12, 14 to form the laminate sheet 200. Where the core material is applied to both of the inner surfaces 56, 58 of the metal sheets 12, 14, the metal sheets 12, 14 may be matched and/or sequenced during the lamination process such that the adhered region 90 defined by the selective application of the core material to the inner surfaces 56, 58 is produced by laminating the matched metal sheets 12, 14. As previously described herein, the method of forming the laminate sheet 200 may include curing the core material after it is applied to the metal sheets 12, 14 prior to laminating. The examples provided herein are illustrative and non-limiting and it would be understood that other methods may be used to apply the core material to the metal sheets 12, 14 to define the adhered and non-adhered regions 90, 84 and to form the adhered regions 90 of the laminate sheet 200.

Indicators, including example indicators 82A, 82B, 82C shown in FIGS. 13 and 17 and referred to collectively herein as indicators 82, may be applied to at least one of the metal sheets 12, 14 during application of the core material and/or during the lamination process forming the laminate sheet 200, to visually and/or physically identify a location and/or feature of an adhered region 90 or a non-adhered region 84 within the laminate sheet 200. One or more of the indicators 82A, 82B may be useful, for example, for positioning the laminate sheet 200 for subsequent processing such as locating the laminate sheet 200 in a cutter or shear press (not shown) to cut lengths of the laminate sheet 200 from the coil, where each length may include at least one repeat of the pattern or a predetermined portion of the pattern, or for positioning the laminate sheet 200 in a forming die (not shown) to orient a feature of the adhered region 90 or the non-adhered region 84 to a feature of the forming die. In another example, indicators 82A, 82B, 82C can be applied to visually and/or physically identify a location and/or feature of an adhered region 90 or a non-adhered region 84 within the laminate sheet 200. As shown in FIGS. 13 and 17, the position of adjacent adhered regions 90 can be identified relative to the indicators 82A, where the indicators 82A may be used to define a lateral blanking line 80 along which a sheet blank 99 including one of the adhered regions 90 can be separated from an adjacent adhered region 90. The position of non-adhered regions 84A located within the adhered region 90 can be identified by indicators 82B and 82C relative to indicator 82A or the blanked edge 87 of the blank 99, for example, for locating the blank 99 in a subsequent operation such as a forming or stamping operation to form a structural component from the blank 99. Each of the indicators 82A, 82B, 82C may be differentiated from each other by shape, size, format, method of application, etc., to provide a visual and/or physical location identifier. For example, one of the indicators 82A, 82B, 82C may be formatted as an adhesive sticker applied to the metal sheet 12, 14, another of the indicators 82A, 82B, 82C may be a mark such as a line, arrow, etc. applied with a marking ink, paint, or similar material deposited onto the metal sheet 12, 14, and yet another of the indicators 82A, 82B, 82C may be formed as a mark, indentation, hole, etc. scribed or punched into the metal sheet 12, 14. The examples provided for formats of the indicators 82 are illustrative and non-limiting, and the format may vary according to the processing requirements of the laminate sheet 200, the pattern of the adhered and non-adhered regions 90, 84 formed by the core layer 10 of the laminate sheet 200, etc.

Referring again to FIGS. 5-10, in the example shown the non-adhered region 84 extends continuously between the core edge 50 of the core layer 10 and the laminate sheet edge 64 to define a weldable margin 60 having a margin width Wm. As previously described, the non-adhered region 84 and the weldable margin 60 defined by the non-adhered region 84 is characterized by a gap 62 formed between the inner surfaces 56, 58 of the metal sheets 12, 14 within the non-adhered region 84. The gap 62 has a gap height H, which in the example shown is approximately the same as the thickness T3 (FIG. 1) of the core layer 10. As shown in the example of FIGS. 5-10, the weldable margin 60 includes an edge portion 74, a trim portion 76, and a weld portion 78. The weld portion 78 is immediately adjacent the core edge 50, and the trim portion 76 is intermediate the weld portion 78 and the edge portion 74. The edge portion 74 includes the laminate sheet edge 64, which included the sheet edge 52 of the first metal sheet 12 and the sheet edge 54 of the second metal sheet 14. The example is illustrative, and other configurations may be used. For example, the weldable margin 60 may include only the weld portion 78, may include the weld portion 78 and the trim portion 76, and/or may include the weld portion 78 and the edge portion 74.

Figure 7:
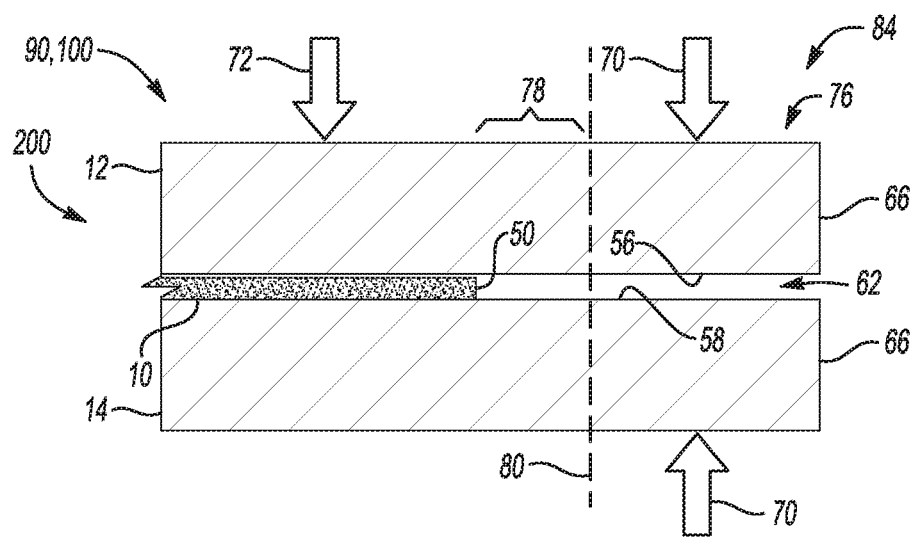
FIG. 7 is a schematic view of the cross-sectional view of FIG. 6, showing the weldable margin during a forming operation and after trimming an edge portion from the laminate sheet of FIG. 6.

The method of forming the laminate sheet 200 can further include removing the edge portion 74, for example, using an edge trimming method such as a sheet slitter (not shown) to provide the laminate sheet 200 shown in FIG. 7, where the edge portion 74 has been removed to produce a trim portion edge 66. The edge portion 74 can be removed, for example, to provide a laminate sheet 200 having trim portion edges 66 which are substantially parallel to each other, by removing the sheet edges 52, 54 which may have become misaligned, wavy, warped and/or otherwise distorted or damaged during forming, handling and/or laminating of the metal sheet 12, 14. The edge portions 74 can be removed, for example, to provide a laminate sheet 200 having a predetermined net width, e.g., the net width being the overall width of the laminate sheet 200 from one trim portion edge 66 to the opposing trim portion edge 66 after removing the edge portion 74. The edge portion 74 has an edge portion width W1, which in an illustrative example may be in the range of 0.125 to 0.50 inches. In one example, the edge portion width W1 is at or about 0.375 inches. The example is illustrative and non-limiting. For example, the edge portion width W1 may be greater or less than 0.50 inches, or may be a different width for one side of the laminate sheet 200 than for the other side of the laminate sheet 200, to provide the desired predetermined net width of the laminate sheet 200, to provide net weldable margins 60 of equal width (Wm−W1, or W2+W3) on both sides of the laminate sheet 200, and/or to provide a known width of weldable margin 60 (W2+W3) between the trim portion edge 66 and the core edge 50.

Figure 9:
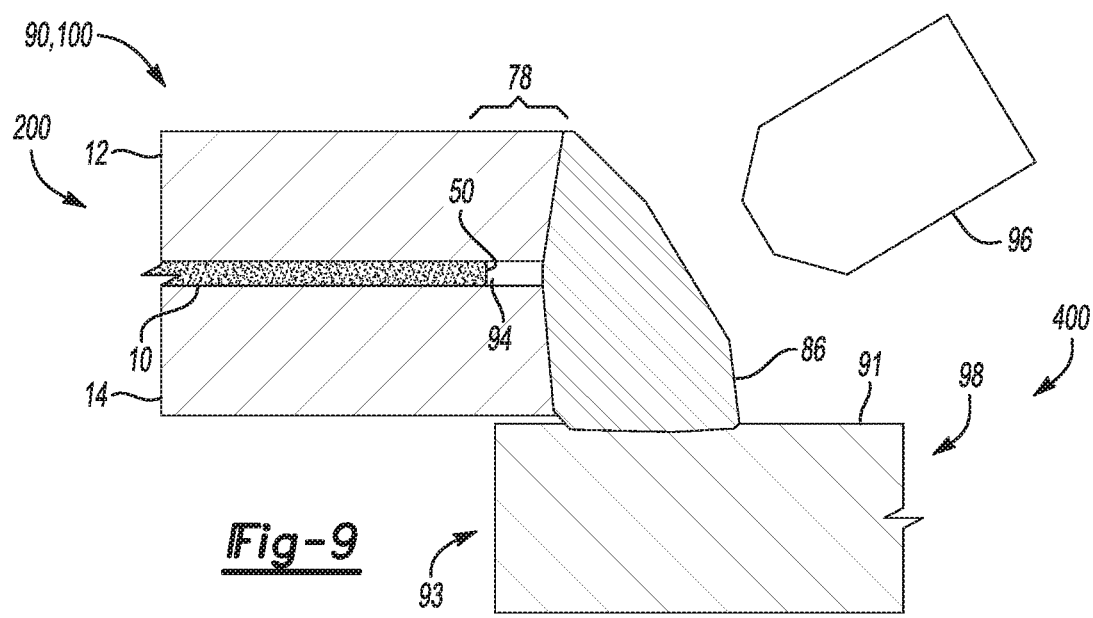
FIG. 9 is a schematic cross-sectional view showing a weld portion of the weldable margin of a laminate sheet overlapping a component, during a second example welding operation to form a weld in the weld portion of the laminate sheet of FIG. 7, to join the laminate sheet to the component.
Figure 10:
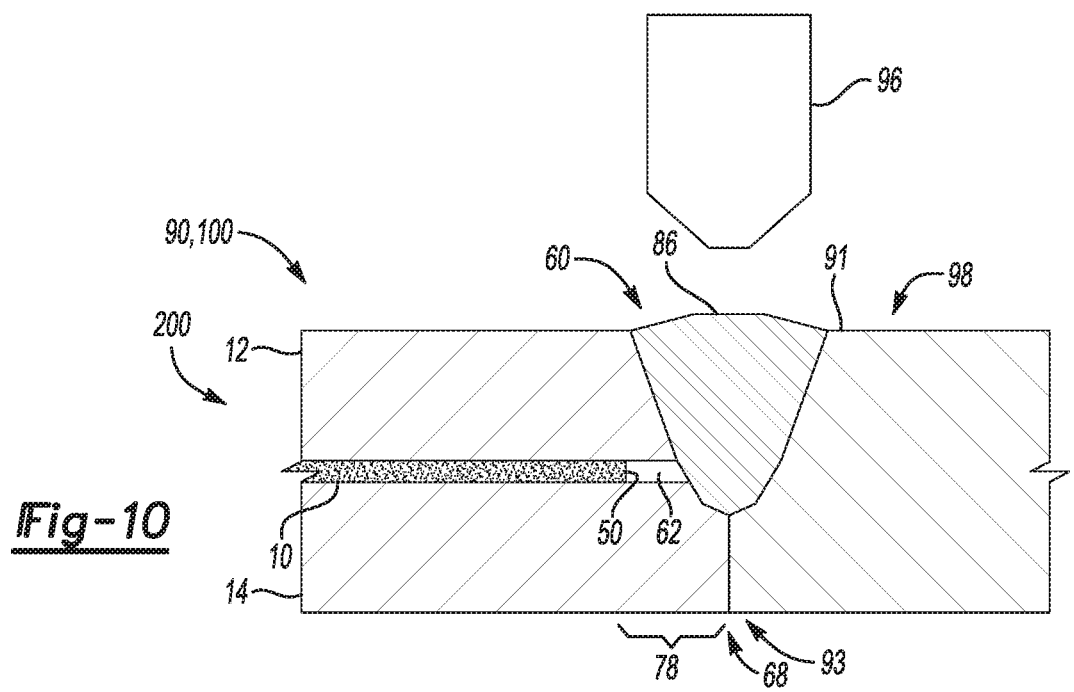
FIG. 10 is a schematic cross-sectional view showing a weld portion of the weldable margin of a laminate sheet abutted to a component, during a third example welding operation to form a weld in the weld portion of the laminate sheet of FIG. 7, to join the laminate sheet to the component.

The method can further include removing the trim portion 76 from the laminate sheet 200 to provide the laminate sheet 200 shown in FIGS. 8-10, where the trim portion 76 has been removed to produce a weld portion edge 68. The trim portion 76 can be removed, for example, to provide a laminate sheet 200 having a weld portion 78 of a predetermined width W3, to prepare the laminate sheet 200 for welding to another component 98 or laminate sheet 200 using any of a variety of welding methods, as illustrated by the non-limiting examples shown in FIGS. 8-10. The trim portion 76 may be removed, for example, during a forming operation such as a blanking operation to form a blank 99 (FIG. 13) from the laminate sheet 200, or during a forming operation such as a stamping operation to form a structural component 300 from the laminate sheet 200, as shown in FIGS. 17-18. The trim portion 76 has a width W2 sufficient for the trim portion 76, for example, to be retained in a trim die portion of a blanking or stamping die (not shown) during blanking of a blank 99 or stamping of the laminate sheet 200 to form the structural component. In a non-limiting example, the trim portion width W2 may be in the range of 0.5 to 1.5 inches. In one example, the trim portion width W2 is at or about 1.25 inches. The example is illustrative, and the trim portion width W2 may be greater or less than 1.25 inches, and may be selected based on the overall width of the laminate sheet 200, the type of forming operation used to remove the trim portion 76 and/or to form a structural component from the laminate sheet 200, the type of blanking operation used to remove the trim portion 76 to form a blank 99, etc.

FIG. 7 shows an illustrative example of removing the trim portion 76 by applying a holding force 70 to the trim portion 76 of the laminate sheet 200 and applying a forming force 72 to the adhered region 90, using, for example, a shear press, a stamping press which may include trim and/or forming dies for applying the holding force 70 and forming force 72, or other similar trimming or forming equipment. In one example, the forming force 72 is applied to the adhered region 84 of the laminate sheet 200 while continuing to apply the holding force 70 to the trim portion 76 of the laminate sheet 200, to remove the trim portion 76 from the laminate sheet 200 along a cut line 80, to size the laminate sheet 200 prior to further processing of the laminate sheet 200, including, by way of example, welding the laminate sheet 200 to another component 98, as shown in FIGS. 8-10. The cut line 80 may also be referred to as a shear line. In this example, the forming force 72 may be characterized as a shearing force or trimming force 72. As shown in FIG. 7, the shear line 80 is distanced from the core edge 50 such that during removal of the trim portion 76, squeezing and/or distortion of the core layer 10 adjacent to and including the core edge 50 is negligible and/or substantially eliminated, such that the core layer 10 is not displaced into the gap 62, is not squeezed out of the adhered region 90, and/or is not otherwise distorted. As such, the adhesive bond formed between the core layer 10 and the first and second metal sheets 12, 14 at and adjacent to the core edge 50 remains intact and is substantially unaffected by the application of the holding and forming forces 70, 72. Further, the noise damping and NVH properties of the adhered region 90 adjacent the core edge 50 remain intact and are substantially unaffected by the application of the holding and forming forces 70, 72.

In another example shown in FIGS. 7, 17 and 18, the laminate sheet 200 can be formed into a structural component 300, referring to the term "structural component" as previously defined herein, where the structural component formed from the laminate sheet 200 includes at least the adhered region 90 adjacent at least on non-adhered region 84, 84A defining a weld portion 78. For example, the structural component 300 may be formed in a single step, where the holding force 70 may be applied to the trim portion 76 during application of the forming force 72, where application of the forming force 72 concurrently forms the structural component and shears the trim portion 76 from the laminate sheet 200 to form a shear edge 85 about a perimeter of the structural component 300, and/or to form an interior shear edge 85A, for example, which defines an aperture 83 within an interior non-adhered region 84A of the structural component 300, as shown in FIGS. 17 and 18. The structural component 300 may be formed from the laminate sheet 200 in multiple steps, for example, in a progressive stamping process, where the laminate sheet 200 is held by application of the holding force 70 to the trim portion 76 in a first stamping die (not shown) while a first forming force 72 is applied to the laminate sheet 200, transferred to a second stamping die (not shown) and retained in the second stamping die by application of the holding force 70 to the trim portion 76 while a second forming force 72 is applied to the laminate sheet by the second stamping die, and so on through a progression of dies, prior to the trim portion 76 being removed in a final step of the stamping progression. As shown in FIG. 7, the application of the holding force 70 in the trim portion 76 is distanced from the core edge 50 such that during application of the forming force 72, squeezing and/or distortion of the core layer 10 adjacent to and including the core edge 50 is negligible and/or substantially eliminated, such that the core layer 10 is not displaced into the gap 62, is not squeezed out of the adhered region 90, and/or is not otherwise distorted during forming and trimming of the structural component. As such, the adhesive bond formed between the core layer 10 and the first and second aluminum sheets 12, 14 at and adjacent to the core edge 50 remains intact and is substantially unaffected by the application of the holding and forming forces 70, 72. Further, the noise damping and NVH properties of the adhered region 90 adjacent the core edge 50 remain intact and are substantially unaffected by the application of the holding and forming forces 70, 72.

In another example, referring to FIGS. 13 and 17, a core edge 50A defines a non-adhered region 84A adjacent to and surrounded by the adhered region 90. The core edge 50A is continuous, and defines the shape of the non-adhered region 84A. The non-adhered region 84A includes a weldable margin 60A which includes a weld portion 78 (FIG. 14) immediately adjacent the continuous core edge 50A such that the weld portion 78 is a continuous weld portion 78, and a trim portion 76 (FIG. 14) is surrounded by the continuous weld portion 78. The method can further include, referring to FIGS. 7, 13, 14, 17 and 18, applying a holding force 70 to the trim portion 76 of the non-adhered region 84A, and applying a forming force 72 to the adhered region 90 surrounding the non-adhered region 84A, while continuing to apply the holding force 70 to the non-adhered region 84A, to remove the trim portion 76 from the laminate sheet 200, thereby forming an aperture 83 (see FIG. 18) in the laminate sheet 200 by removal of the trim portion 76, where the aperture 83 is defined by the continuous weld portion 78 and weld portion edge 68. During forming of the aperture 83 in the laminate sheet 200, the core layer 10 adjacent to and including the continuous core edge 50A is distanced from the shear line 80 at which the trim portion 76 is removed to form the aperture 83, such that the core layer 10 and continuous core edge 50A is substantially unaffected by the holding and forming forces 70, 72 applied to the laminate sheet 200 during formation of the aperture 83 within the adhered region 90, and such that the bonding and NVH properties of the laminate structure 100 at and adjacent to the continuous core edge 50 remain intact. The aperture 83 thus formed is defined by and includes the continuous weld portion 78 immediately adjacent the continuous core edge 50A, enabling welding at the weld portion edge 68 defining the aperture 83, without affecting and/or deteriorating the continuous core edge 50A or the core layer 10 adjacent the core edge 50A and aperture formed by removal of the trim portion 76.

Referring now to FIGS. 8-10, shown are example methods of welding the laminate sheet 200 and/or a structural component 300 formed therefrom to a component 98. In the examples shown, the component 98 is a metal component, and can be made from a metal-based material suitable for welding to the metal sheets 12, 14 of the laminate sheet 200. In a non-limiting example, the component 98 and the metal sheets 12, 14 are made from an aluminum based metal. The component 98 can be provided for welding as a sheet or as a formed component where the term "formed component" is not intended to be limiting, such that the component 98 may be formed by rolling, casting, forging, stamping, heading, machining, bending, pressing, or any other suitable metal forming method. In one example, the component 98 can be a laminate sheet 200 or a structural component 300 formed from a laminate sheet 200, such that FIGS. 8-10 are illustrative of methods for joining two or more laminate sheets 200 to each other using the welding methods of FIGS. 8-10, wherein the weld 86 is formed in the weld portion 78 of a first laminate sheet 200 joined to the weld portion 78 of a second laminate sheet 200 represented in FIGS. 8-10 by the component 98.

Referring now to FIG. 8, a method of joining overlapping portions of first and second laminate sheets 200 by welding is shown. The method includes positioning the first laminate sheet 200 to be welded to the second laminate sheet 200 such that the weldable margins 60 of the first and second laminate sheets 200 are overlapping, where in the example shown each weldable margin 60 includes a weld portion 78, and joining the first and second laminate sheet 200 together by forming a metal weld 86 within the weldable margins 60, e.g., within the weld portions 78, of the overlapping laminate sheets 200, as shown by the illustrative example in FIG. 8. In the example shown, the joint defined by the weld 86 can be referred to as a lap joint. In the illustrative example shown, electrodes 88 are energized to apply an electrical current through the weldable margins 60 of the overlapping laminate sheets 200, to form a resistance or spot weld. In the example shown, the welding electrodes 88 exert a pressure against each other to press the first and second inner surfaces 56, 58 of the weld portions 78 of each of the laminate sheets 200 together and to press the adjacent outer surfaces of the first and second laminate sheets 200 against each other, prior to applying an electrical current to form the weld. In the example shown, the weld 86 joining the laminate sheets 200 is formed between the surfaces 56, 58 of the weld portions 78, and between the metal sheet 14 of the first laminate sheet 200 and the adjacent metal sheet 12 of the second laminate sheet 200, to provide an assembly 400, which may also be referred to herein as a welded assembly 400. The illustrative example of a resistance weld is non-limiting, and it would be understood that other types of welding such as laser welding, electron beam welding, cold metal transfer (CMT) welding, inductive welding, etc. could be used to form welds 86 to join the weld portion 78 to the component 98. As shown in FIG. 8, the weld 86 is positioned within the weld portion 78 of the weldable margins 60 of each of the laminate sheets 200 such that the core edge 50 and the core layer 10 adjacent the core edge 50 of each of the laminate sheets 200 is substantially unaffected by heat generated during forming of the weld 86. In one example, the weld 86 can be positioned as shown in FIG. 8 within the weldable margin 60 such that a space 94 is formed between the core edge 50 and the metal weld 86 in the gap 62, where the space 94 thermally insulates the core edge 50 from heat generated by formation of the weld 86, e.g., the air in the space 94 acts as a thermal insulating barrier to reduce heat conduction to core edge 50. Further, the space 94 physically separates the core edge 50 from the weld 86 such that the weld 86 is not contaminated by core material forming the core layer 10. By substantially reducing and/or effectively preventing significant heat conduction to the core edge 50 and core layer 10, heat related degradation including vaporizing and/or liquefying of the core material of the core layer 10 is prevented. By preventing degradation of the core layer 10, adhesion between the core layer 10 and the first and second metal sheets 12, 14 in the adhered region 90 at and adjacent to the core edge 50 is retained, and contamination of the weld 86 by core material is avoided. By preventing contamination of the weld 86, formation of porosity or other discontinuity in the weld 86 is avoided, ensuring the integrity and reliability of the weld 86 to join the laminate sheets 200. The example shown is illustrative, and it would be understood that the method shown can be used to join a non-adhered region 84 of a laminate sheet 200 and/or laminate structural component 300 to another component 98, where the other component 98 can be made of a metal based material and/or which can be a monolithic, e.g., non-laminated component.

Referring now to FIG. 9, a method of joining overlapping portions of a laminate sheet 200 and a component 98 by welding is shown. The method includes positioning a component 98 to be welded to the laminate sheet 200 adjacent to the weldable margin 60 of the laminate sheet 200, where in the example shown the weldable margin 60 includes the weld portion 78, and welding the laminate sheet 200 to the component 98 by forming one or more metal welds 86 within the weldable margin 60, e.g., within the weld portion 78. In the example shown, the component 98 includes an end 93 and a surface 91, and positioning the component 98 adjacent the laminate sheet 200 includes positioning the surface 91 of the component proximate to the metal sheet 14 such that the component surface 91 overlaps the weld portion 78. In the example shown, a welding device 96 is activated to form a weld 86 joining the weld portion 78 of the laminate sheet 200 to the component 98, to provide an assembly 400. In the example shown, the weld 86 joins the first and second metal sheets 12, 14 of the laminate sheet 200 to each other and to the component 98. In an illustrative example, the welding device 96 can be a MIG welding device, and it would be understood that other types of welding such as laser welding, electron beam welding, etc. could be used to form weld 86 to join the weld portion 78 to the component 98. As shown in FIG. 9, the weld 86 is positioned within the weld portion 78 of the weldable margin 60 such that the core edge 50 and the core layer 10 adjacent the core edge 50 is substantially unaffected by heat generated during forming of the weld 86. In one example, the weld 86 can be positioned as shown in FIG. 9 within the weldable margin 60 such that a space 94 is formed between the core edge 50 and the metal weld 86 in the gap 62, where the space 94 thermally insulates the core edge 50 from heat generated by formation of the weld 86, e.g., the air in the space 94 acts as a thermal insulating barrier to reduce heat conduction to core edge 50. Further, the space 94 physically separates the core edge 50 from the weld 86 such that the weld 86 is not contaminated by core material forming the core layer 10. By substantially reducing and/or effectively preventing significant heat conduction to the core edge 50 and core layer 10, heat related degradation including vaporizing and/or liquefying of the core layer is prevented. By preventing degradation of the core layer 10, adhesion between the core layer 10 and the first and second metal sheets 12, 14 in the adhered region 90 at and adjacent to the core edge 50 is retained, and contamination of the weld 86 by core material is avoided. By preventing contamination of the weld 86, formation of porosity or other discontinuity in the weld 86 is avoided, ensuring the integrity and reliability of the weld 86 to join the laminate sheet 200 to the component 98.

Referring now to FIG. 10, another embodiment of a method of joining a laminate sheet 200 and a component 98 by welding is shown. The method includes positioning, e.g., abutting, the end 93 of a component 98 to be welded to the laminate sheet 200 adjacent to the weld portion edge 68 (FIG. 9) of the weld portion 78 of the laminate sheet 200, and welding the laminate sheet 200 to the component 98 by forming a metal weld 86 at the interface of the component end 93 and the weld portion edge 68, where the weld 86 is formed within the weldable margin 60, e.g., within the weld portion 78. In the example shown, a welding device 96, such as a MIG welder, is used to form the weld 86, to join the weld portion 78 of the laminate sheet 200 to the component 98, thus forming an assembly 400. The illustrative example of a MIG welder is non-limiting, and it would be understood that other types of welding such as laser welding, resistance welding, electron beam welding, cold metal transfer (CMT) welding, inductive welding, arc welding, etc. could be used to form a weld 86 to join the weld portion 78 to the component 98. As shown in FIG. 10, the weld 86 is positioned within the weld portion 78 of the weldable margin 60 such that the core edge 50 and the core layer 10 adjacent the core edge 50 is substantially unaffected by heat generated during forming of the weld 86. As described for FIG. 9, the weld 86 can be positioned as shown in FIG. 10 within the weldable margin 60 such that a space 94 is formed between the core edge 50 and the metal weld 86 in the gap 62, where the space 94 thermally insulates the core edge 50 from heat generated by formation of the weld 86, and the space 94 physically separates the core edge 50 from the weld 86 such that the weld 86 is not contaminated by core material forming the core layer 10, and such that formation of porosity or other discontinuities in the weld 86 from contamination is avoided. The example shown in FIG. 10 is illustrative, and it would be understood that the method shown can be used to form a weld 86 between abutting first and second laminate sheets 200 to join the non-adhered regions 84 of the laminate sheets 200 to each other, where the weld 86 can be positioned within the non-adhered weldable margins of the abutting laminate sheets 200 such that the core layers 10 adjacent the core edges 50 of the abutting laminate sheets 200 are substantially unaffected by heat generated during forming of the weld 86.

The examples shown in FIGS. 8-10 are illustrative, and it would be understood that the weldable margin 60 defined by the non-adhered region 84 of the laminate sheet 200 could be joined to another component 98 and/or another laminate sheet 200 using other joining methods requiring localized heating of the non-adhered region 84, such as brazing or soldering, where during localized heating of the weldable margin 60 during the joining process, for example, during brazing or soldering, the core layer 10 adjacent the core edge 50 is substantially unaffected by heat generated during forming of the weld 86, such that during joining, heat related degradation including vaporizing and/or liquefying of the core layer is prevented. By preventing degradation of the core layer 10, adhesion between the core layer 10 and the first and second metal sheets 12, 14 in the adhered region 90 at and adjacent to the core edge 50 is retained, and contamination by core material of the joint formed by the brazing or soldering is avoided.

Figure 11:
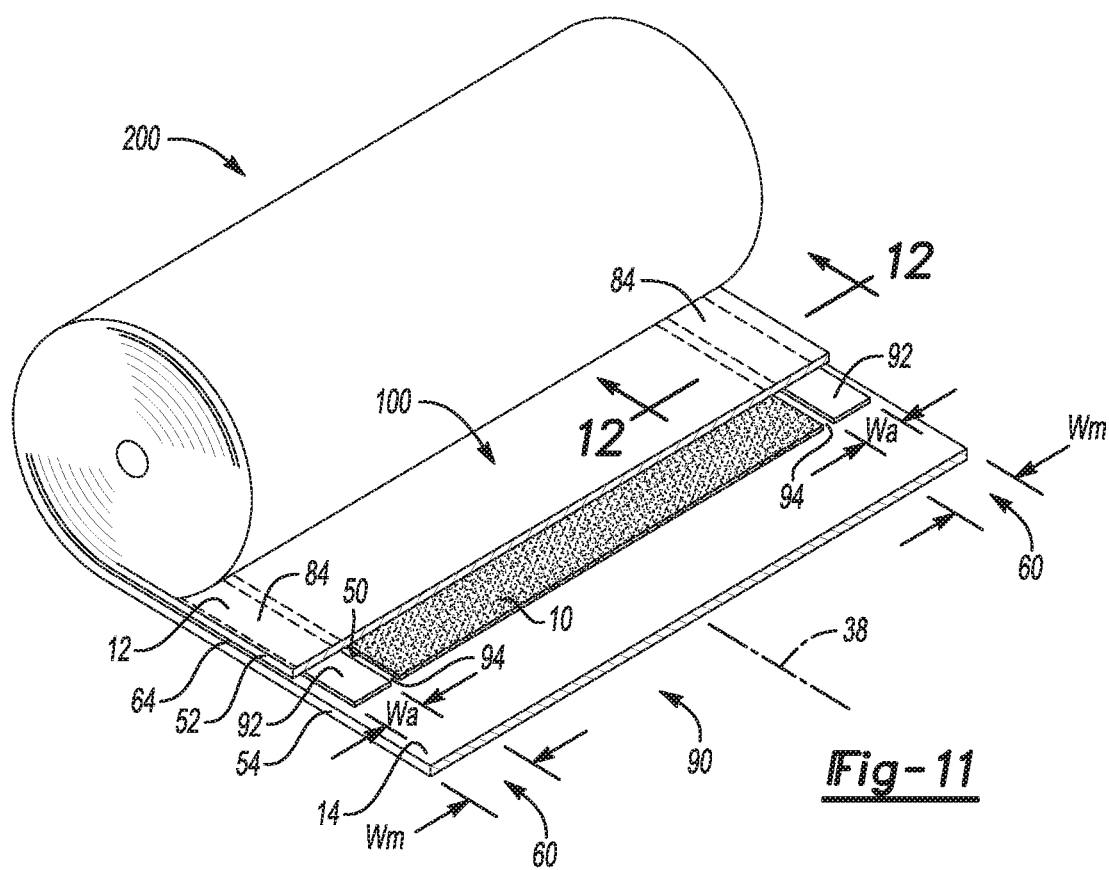
FIG. 11 is a schematic perspective and fragmentary view of a second embodiment of a partly unrolled coil of the laminate sheet, showing the first metal sheet partially stripped away, and the core layer and a weldable insert disposed in the weldable margin partially stripped away and partially shown in phantom, to illustrate a weldable margin including the weldable insert inserted into the margin.
Figure 12:
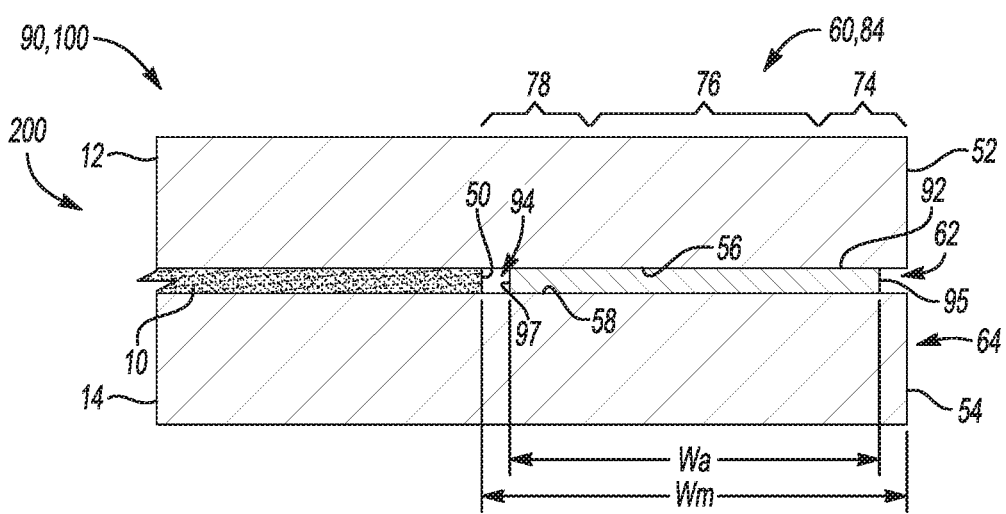
FIG. 12 is a schematic cross-sectional view of section 12-12 of FIG. 11, showing a weldable insert inserted into the weldable margin of the laminate sheet of FIG. 11.

Referring now to FIGS. 11 and 12, the laminate sheet 200 can include a weldable insert 92 disposed in the gap 62 between the first and second sheets 12, 14, such that welding the laminate sheet 200 to the component 98 includes forming the metal weld 86 such that the metal weld 86 joins the first and second metal sheets 12, 14, the weldable insert 92, and the component 98. As shown in FIG. 12, the weldable insert 92 includes a first edge 95 and a second edge 97 which define an insert width Wa. In the example shown, the insert width Wa is less than the margin width Wm, and the weldable insert 92 is positioned in the gap 62 such that a space 94 is formed between the second insert edge 97 of the weldable insert 92 and the core edge 50 in the gap 62, where, as described previously herein, the space 94 insulates the core edge 50 from the weldable insert 92. The example is non-limiting, and the insert width Wa may be greater than the margin width Wm, such that the first edge 95 of the weldable insert 92 may extend laterally outside of the laminate sheet edge 64, for example, after insertion of the weldable insert 92 into the gap 62. In this case, the weldable insert 92 can be positioned relative to the gap 62 to establish the space 94. The weldable insert 92 is made from one of a metal-based material which is compatible for forming a weld 86 with the metal sheets 12, 14 and/or the component 98. In one example, the weldable insert 92 can be a metal foil, such as an aluminum foil, which may be inserted and/or positioned in the weldable margin 60 prior to or during lamination of the laminate sheet 200.

Figure 15:
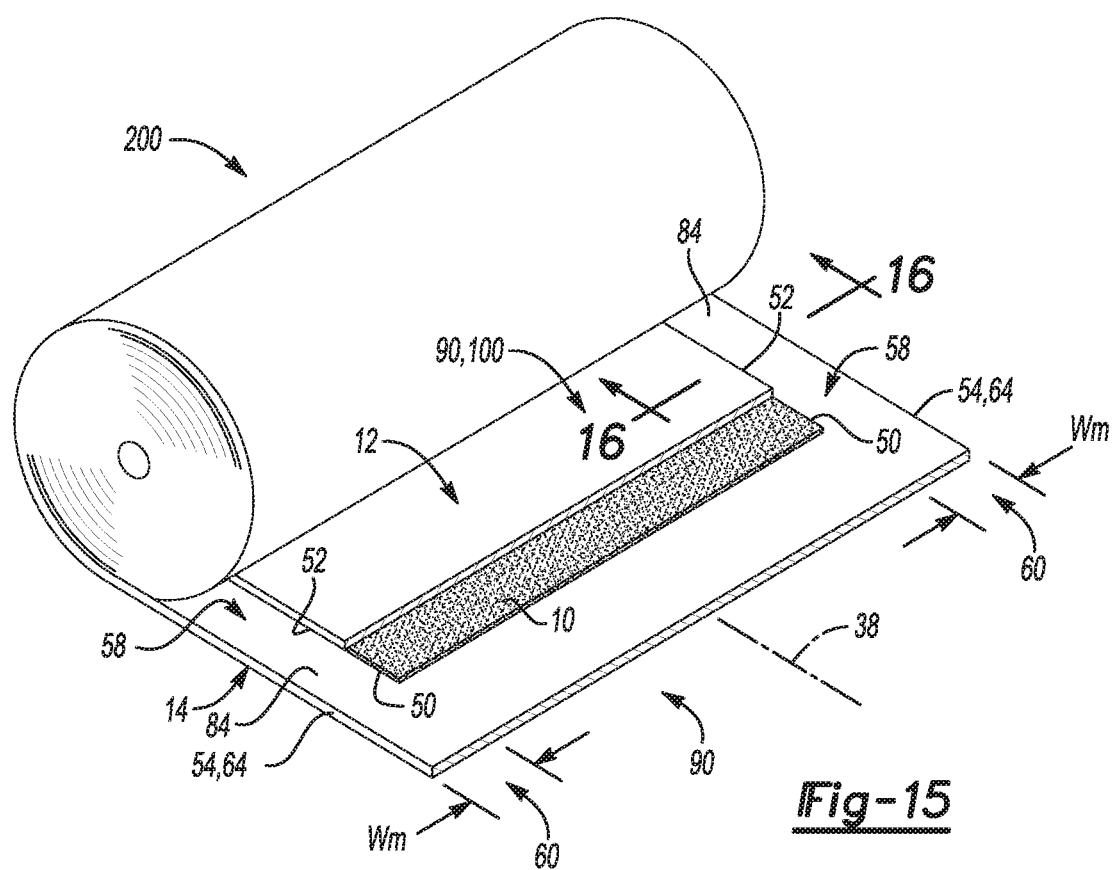
FIG. 15 is a schematic perspective and fragmentary view of a fifth embodiment of a partly unrolled coil of a laminate sheet showing a first metal sheet and a core layer partially stripped away to illustrate a weldable margin defined by the second metal sheet bounded by an edge of the laminate structure and an edge of the second metal sheet.
Figure 16:
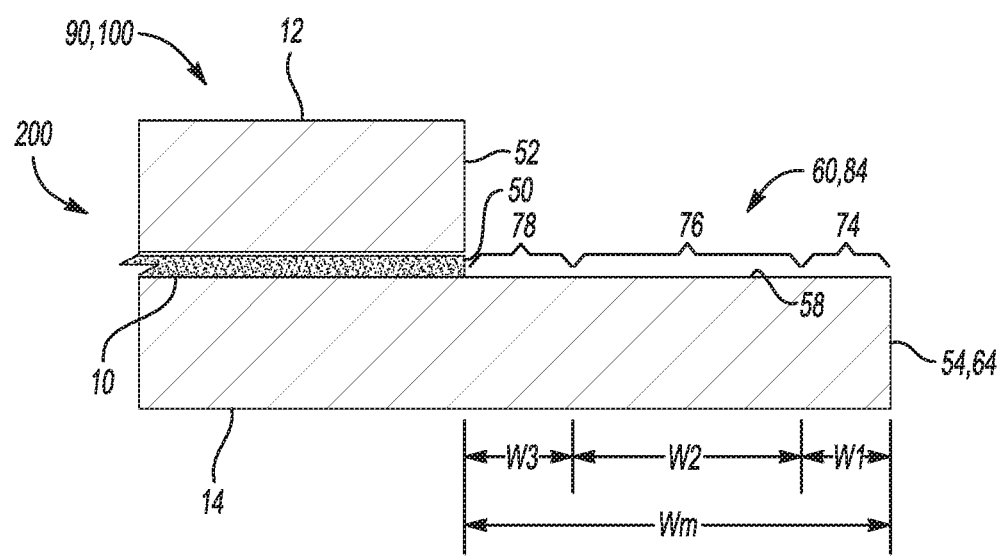
FIG. 16 is a schematic cross-sectional view of section 16-16 of FIG. 15, showing the weldable margin after forming the laminate structure of FIG. 15.

Referring now to FIGS. 15 and 16, another embodiment of a laminate sheet 200 including an adhered region 90 and non-adhered region 84 is provided. In the example shown, the width of the second metal sheet 14 is greater than the width of the first metal sheet 12, such that the sheet edge 54 of the second metal sheet 14 defines the laminate sheet edge 64. The core layer 10 is coextensive with the first metal sheet 12 and, as previously described herein, defines an adhered region 90 of the laminate sheet 200. A non-adhered region 84 of the second metal sheet 14 extends from the core edge 50 to the laminate sheet edge 54, 64, and defines a weldable margin 60 having a margin width Wm as shown in FIG. 15. As shown in FIG. 16, the weldable margin 60 includes a weld portion 78 immediately adjacent the core edge 50, and can further include a trim portion 76 and/or an edge portion 74. As previously described herein, the laminate sheet 200 shown in FIGS. 15 and 16 can be trimmed to remove the edge portion 74 and/or the trim portion 76, and can be formed into a structural component, for example, by applying a holding force 70 and forming force 72. The laminate sheet 200 shown in FIGS. 15 and 16 can be welded as described for FIGS. 8-10, by forming a weld 86 in the weld portion 78 defined by the non-adhered region 84 of the second metal sheet 14, where the core edge 50 and the core layer 10 adjacent the core edge 50 remain unaffected by formation of the weld 86 in the weld portion 78 such that the bonding and the NVH characteristics of the laminate sheet 200 adjacent the core edge 50 remain intact after welding.

Referring now to FIGS. 17-20, an example laminate sheet 200 is shown in FIG. 17 which includes an adhered region 90 defined by a laminate structure 100, and a plurality of non-adhered regions 84, 84A. In the example shown in FIG. 17, the laminate sheet 200 can be sheared or otherwise separated from a continuous laminate sheet 200 along blanking lines 89, which can be identified on the continuous laminate sheet 200 by indicators 82A, to provide a stamping blank from which the laminate structural component 300 shown in FIG. 18 can be formed. The laminate sheet 200 is formed, for example by stamping, into the example structural component 300 shown in FIG. 18 which in the illustrative example includes one or more formed structural features 81. The laminate sheet 200 shown in FIG. 17 can include one or more indicators 82, such as indicators 82B and 82C, which can be used to orient the laminate sheet 200 relative to a forming tool such as stamping die, such that the non-adhered regions 84, 84A of the laminate sheet 200 can be positioned relative to the stamping die. The laminate structural component 300 can be sheared from the laminate sheet 200 during forming along shear lines 80, 80A (see FIG. 17) to define a sheared edge 85 (see FIG. 18) along the perimeter of the structural component 300. In the example shown, one or more apertures 83, 83A can be formed in the structural component 300, where one or more formed structural features 81 and/or welded structural features 79 may be located proximate the apertures 83, 83A to stiffen and/or selectively increase the bending strength of the structural component 300 in these areas.

The formed structural features 81 can include, as illustrated by example in FIG. 18, ribs or depressions 81A, channels 81B, other contoured shapes such as the dished features 81C, and/or other formed structural features such as beads, bends and offsets which can be mechanically formed during the formation of the structural component 300 from the laminate sheet 200. The formed structural features 81 can be configured to increase the stiffness, rigidity and/or bending strength of the laminate structural component 300. As previously described herein the formed structural features 81 can protrude from the structural component 300 such that the packaging space, e.g., the effective volume, consumed by the structural component 300 is increased by the protruding structural components 300, relative to the substantially flat portions of the structural component and/or laminate sheet 200. Further, forming the structural features 81 increases tooling complexity, and can increase the forming forces (for example, die, extrusion, and bending pressures) required to form the structural features 81, which can accelerate tooling wear. Formation of the structural features 81 necessarily distorts and/or stresses the laminate sheet 200 by bending, extruding or otherwise deforming the laminate sheet 200 to form the structural features.

In the example shown, one or more welds 84A are formed in selective non-adhered regions 84A of the laminate sheet 200, which in the illustrative example are welded after forming of the structural component 300, such that the welds 84A and area of the laminated sheet 200 adjacent the welds 84A are not stressed or otherwise distorted by forming forces imposed on the laminate sheet 200 during mechanical forming of the structural component 300 from the laminate sheet 200, and such that the integrity of these welds 84A is unaffected by the forming forces. As shown in FIG. 19, the weld 84A is formed between the first and second metal sheets 12, 14 to provide a joint which selectively joins the first and second metal sheets 12, 14 in the non-adhered region 84A, thus closing the gap 62 between the sheets 12, 14. As such, the weld 86A joining the non-adhered regions of the metal sheets 12, 14 can cause the metal sheets 12, 14 to exert a compressive stress on the core edge 50 of the core layer 10, where the core edge 50 bounds the non-adhered region 84A in which the weld 86A is formed. The compressive stress can effectively provide a resistive force to forces imposed on the laminate structural component 300 during subsequent processing and/or imposed on the component 300 in use, including mechanical and/or thermal forces which could act to separate the core layer 10 from the metal sheets 12, 14 at and immediately adjacent the non-adhered region 84A. As shown in FIG. 19, the weld 84A can be formed by a welding device 96, which in an illustrative example can be a MIG welder, a laser welder, or the like configured to form the weld 86A. The weld 86A can be formed as a continuous weld seam and/or can comprise a plurality of spot welds arranged within a non-adhered region 84A of the structural component 300. As shown in FIG. 19, the weld 86A is formed in the weldable margin 60 defined by the non-adhered region 84A such that the core edge 50A and the core layer 10 adjacent the core edge 50A remains unaffected by formation of the weld 86A, and such that the bonding and the NVH characteristics of the laminate sheet 200 adjacent the core edge 50 remain intact after welding.

The weld 86A selectively stiffens and/or strengthens the localized area of the laminated sheet 200 including the weld 86A, such that a welded structural feature 79 is defined by the weld 86A formed in the non-adhered region 84A. As such, one or more welded structural features 79 can be substituted for a corresponding one or more formed structural features 81, such that the corresponding formed structural features 81 can be removed from the configuration of the structural component 300, thereby decreasing the forming complexity and packaging space requirements of the structural component 300. It would be understood that the configuration, e.g., the size, location, arrangement, etc., of one or more welded structural features 79 used in substitution for one or more formed structural features 81 may or may not correspond to the configuration, e.g., the size, location, arrangement, etc., of the substituted formed structural features 81.

Figure 20:
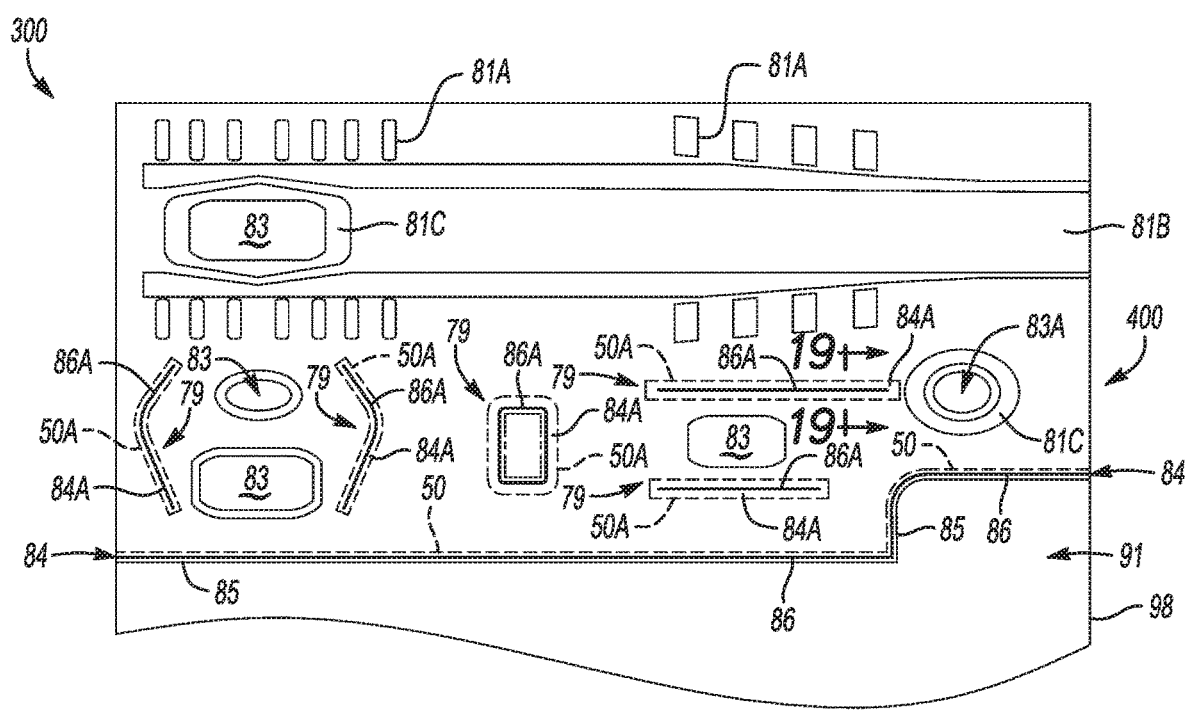
FIG. 20 is a schematic top view of the structural component of FIG. 18 including a plurality of welded structural features formed therein and of an assembly formed by attachment of a non-adhered region of the structural component to another component.

As shown in FIG. 20, the laminate structural component 300 can be joined to another component 98, as previously described herein, to form an assembly 400, by a joint including a weld 86 formed in a non-adhered region 84, where in the example shown a sheared edge 85 of the structural component 300 overlaps the other component 98, and the components 300, 98 are joined by a weld 86 formed in the non-adhered region 84 immediately adjacent the sheared edge 85. The welds 86A defining the welded structural features 79 can be formed before or after welding the structural component 300 to the other component 98 to form the welded assembly 400. In one example, the welded structural features 79 can be welded prior to joining the structural component 300 to another component 98, to increase the rigidity of the structural component 300 to facilitate positioning of the structural component 300 relative to the other component 98 for forming the joining weld 86 along the shear line 85. In another example, the welded structural features 79 can be welded contemporaneously and/or concurrently with, and/or in the same process and/or fixture and/or using the same welding device 96, forming of the weld 86 joining the structural component 300 to the other component 98. In one example, welding of the welds 86, 86A can be performed contemporaneously and/or concurrently by one or more welding devices 96. In one example, the welding operation and/or welding devices 96 can be robotically controlled and/or otherwise automated.

Figure 21:
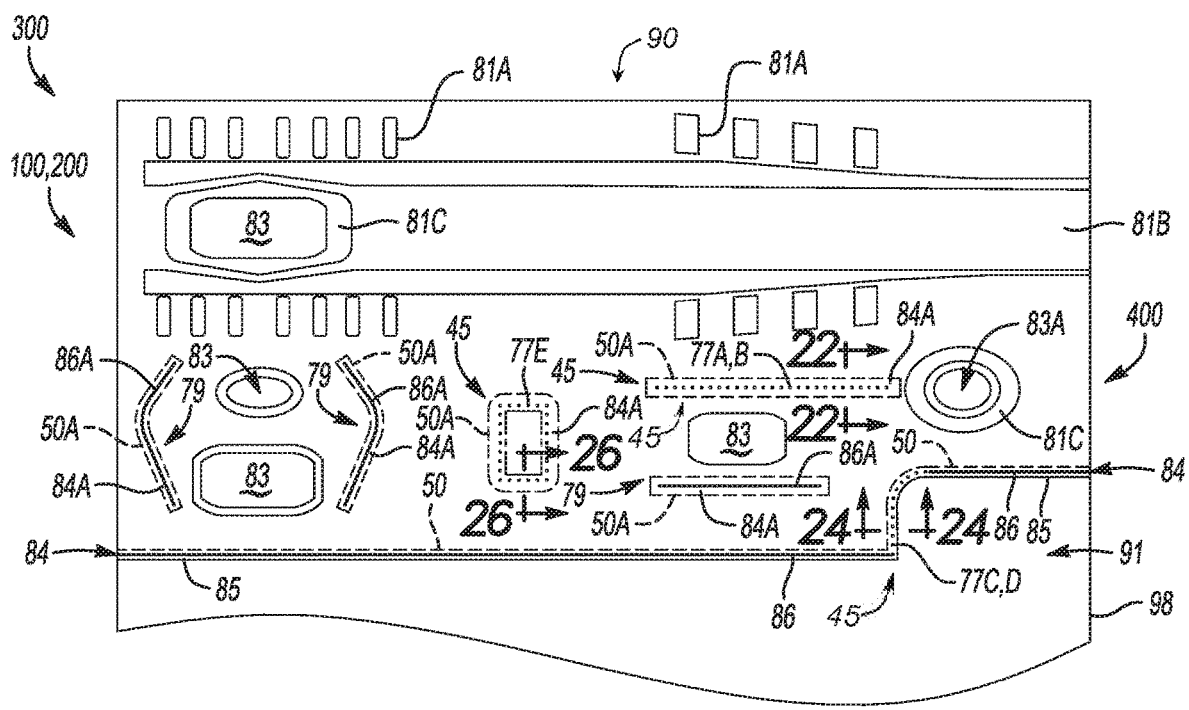
FIG. 21 is a schematic top view of the structural component of FIG. 18 including a plurality of fastened structural features and welded structural features formed therein and of an assembly formed by attachment of a non-adhered region of the structural component to another component.

Referring now to FIG. 21, shown is an example laminate sheet 200 as described for FIG. 17, including an adhered region 90 (see FIG. 17) defined by a laminate structure 100, and a plurality of non-adhered regions 84, 84A. As shown in FIG. 21 and described for FIGS. 18 and 20, the laminate sheet 200 can be formed into the example structural component 300 shown in FIG. 18 including one or more formed structural features 81 including, as shown in FIGS. 18 and 21, formed structural features 81A, 81B, 81C. As shown in FIG. 21 and described for FIG. 20, the structural component 300 can include one or more welded structural features 79 each including at least one weld 86 formed within a non-adhered region 84 within the laminate sheet 200. As shown in the example of FIG. 21, the laminate structure 300 can include one or more fastened structural features 45 each including at least one fastener 77 installed within a non-adhered region 84 within the laminate sheet 200. FIGS. 22-26 illustrate non-limiting examples of various fasteners 77, including fasteners 77A, 77B, 77C, 77D, and 77E, which can be installed in the non-adhered regions 84 to form one or more fastened structural features 45. The laminate sheet 200 can be strengthened and/or stiffened in the localized region proximate the fastened structural feature 45, such that the fastened structural feature 45 strengthens and/or stiffens the laminate sheet 200 and/or a structural component 300 formed therefrom in the localized portion of the laminate sheet 200 proximate to, e.g., immediately adjacent to the fastened structural feature 45. The fastened structural feature 45 attaches the first and second metal sheets 12, 14 to form a joint 67 including a joint interface 69, wherein the joint interface 69 is characterized by the first and second metal sheets 12, 14 in direct contact with each other within the non-adhered region 84, 84A. Forming the fastened structural feature 45 with the metal sheets 12, 14 in direct contact with each other in the non-adhered region 84, 84A yields a joint 67 which is characterized by a joint strength and/or joining force, such as a joint torque, which remains constant over time, e.g., does not deteriorate. For example and by comparison, a similar type joint formed in the adhered region 90 of the laminate may exhibit a reduced joining force over time, as the core layer 10 proximate the fastener 77 and separating the metal sheets 12, 14 is compressed under the joint load, migrates away from the fastener 77, and/or is squeezed out from between the metal sheets 12, 14 in the joint interface area over time, thus causing the joint in the adhered region 90 to loosen, exhibit torque relaxation, and/or reduce in joint strength over time. As illustrated by the examples shown in FIGS. 22-26, the fastener 77 is located within the non-adhered region 84, 84A at a distance from the core edge 50 such that a space 94 is maintained between the core edge 50 and the fastener 77, and such that the fastener 77 is installed without affecting and/or deteriorating the core edge 50 or the core layer 10 adjacent the core edge 50.

Figure 22:
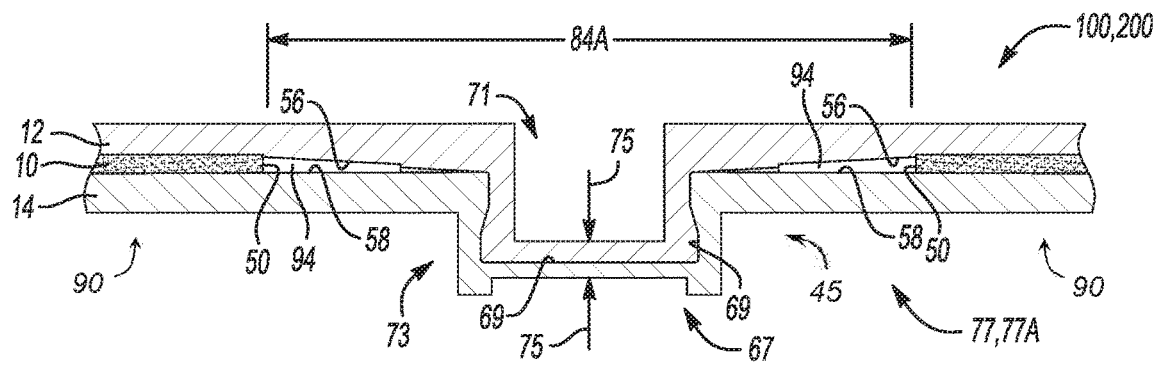
FIG. 22 is a schematic cross-sectional view of section 22-22 of FIG. 21, showing a first example fastened structural feature formed in a non-adhered region of the structural component of FIG. 21.
Figure 23:
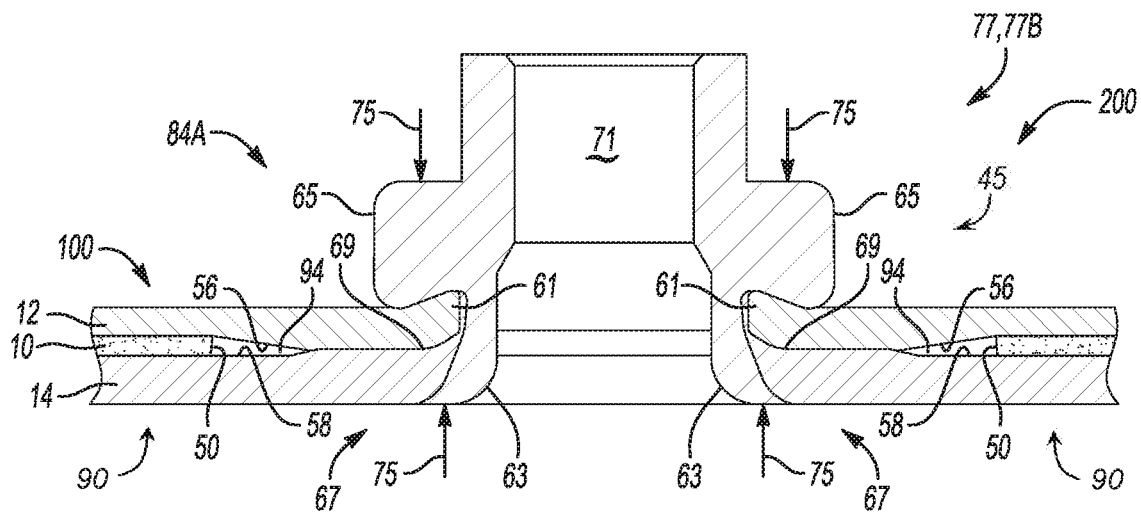
FIG. 23 is a schematic cross-sectional view of section 22-22 of FIG. 21, showing a second example fastened structural feature formed in a non-adhered region of the structural component of FIG. 21.

In one configuration, the fastened structural features 45 can be configured to fasten the first and second metal sheets 12, 14 to each other, as illustrated by the example fasteners 77A and 77B shown in FIGS. 22 and 23. In another configuration illustrated by the example fasteners 77C, 77D and 77E shown in FIGS. 24, 25 and 26, the fastened structural features 45 can be configured to fasten the first and second metal sheets 12, 14 to each other, and to attach the laminate sheet 200 to another component such as component 98 shown in FIGS. 24 and 25. In the examples shown in FIGS. 22-25, one or both of the metal sheets 12, 14 are deformed or otherwise work hardened during formation of the joint 67 resulting in localized hardening of the metal sheets 12, 14 and/or a localized increase in tensile strength of the metal sheets 12, 14 in and adjacent the joint interface 69. Localized hardening and/or localized increases in tensile strength can provide a relative increase in the joint strength and/or fatigue strength of the joint 67. The relative increase in joint strength and/or fatigue strength, and/or compression of and/or change in the shape of the metal sheets 12, 14 by the fastener 77 in the joint 67 can provide a relative increase in resistance to crack formation and/or crack propagation in the joint 67.

Figure 25:
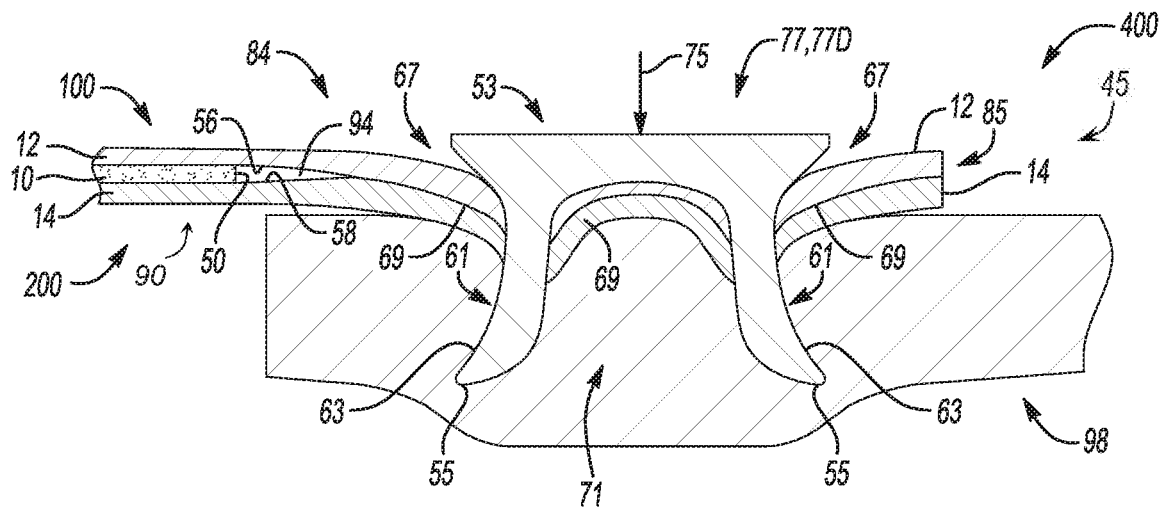
FIG. 25 is a schematic cross-sectional view of section 24-24 of FIG. 21, showing a fourth example fastened structural feature attaching the non-adhered region of the structural component to the other component to form the assembly of FIG. 21.
Figure 26:
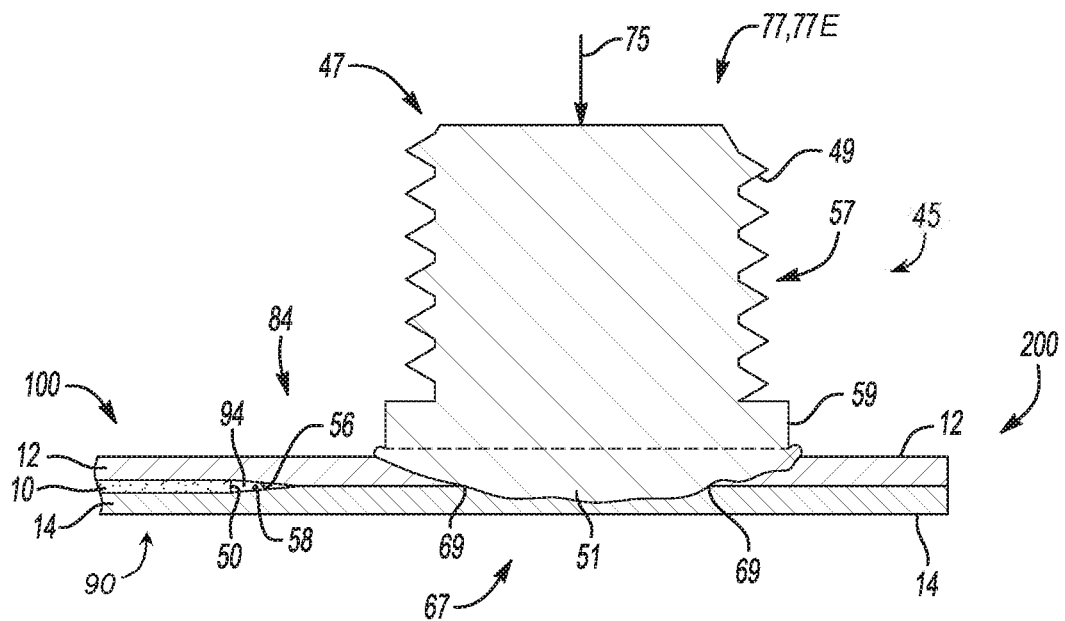
FIG. 26 is a schematic cross-sectional view of section 26-26 of FIG. 21, showing a fifth example fastened structural feature formed in a non-adhered region of the structural component of FIG. 21.

The examples provided by the illustrations are non-limiting, and it would be understood that other types of fasteners 77 and/or other configurations of installing the fastener 77 are possible to form a fastened structural feature 45, and/or a combination of various types of fasteners 77 and/or fastened structural features 45 can be installed in a laminate sheet 200 to form a structural component 300. For example, referring to FIG. 21, a structural component 300 is shown including a plurality of fastened structural features 45 formed using a combination of two or more of fasteners 77A, 77B, 77C, 77D and 77E. Comparing the structural components 300 shown in FIGS. 20 and 21, it is shown that a fastened structural feature 45 can be substituted for a welded structural feature 79, which may be beneficial, for example, to reduce the weld density in the structural component 300, and/or to allow for the addition of structural features after welding of the structural component 300 has been completed, and/or to allow for the attachment of other components 98 after welding of the structural component has been completed. Advantageously, fastened structural features 45 such as those including fasteners 77C, 77D and 77E can be used for attachment of another component 98 which cannot be attachable to the laminate sheet 200 by welding and/or has properties which can be deteriorated by welding, for example, by oxidation, contamination, or heat exposure, such as a component 98 including polymeric, rubber, and/or other non-metallic materials, or a component 98 including metals which are not suitable for welding to the metal of one or both of the metal layers 12, 14. Advantageously, fastened structural features 45 such as those including fasteners 77C, 77D and 77E can be used for attachment of another component 98 which may be attachable to the laminate sheet 200 by adhesive methods, where an attachment force which is relatively stronger than the adhesive force, and/or less susceptible to fluctuation and/or deterioration over time and/or with exposure to variations in operating conditions including temperature fluctuations, is desired or required. The examples shown in FIGS. 24, 25 and 26 are non-limiting, and it is understood that each of the fasteners 77C, 77D, 77E shown therein could be used to form a joint 67 between the metal sheets 12, 14 of the laminate sheet 200 without attaching another component 98, or form a fastened structural feature 45 within the non-adhered region 84 of the laminate sheet 200.

Referring to FIG. 22, shown is a non-limiting example of a fastened structural feature 45 formed in a non-adhered region 84A (see FIG. 21) of a structural component 300. The fastened structural feature 45 is formed by deforming the first and second metal sheets 12, 14 within the non-adhered region 84A to form a fastener 77A. The fastener 77A may also be known as and/or referred to herein as a clinch rivet 77A. In an example method, the fastener 77A is formed by first and second tools (not shown) applied concurrently to opposing surfaces of the laminate sheet 200 in the non-adhered region 84, 84A in the direction of the arrows 75 to deform the first and second metal sheets 12, 14 to form a cavity 71 and a protrusion 73 as shown in FIG. 22. The fastener 77A, including the cavity 71 and protrusion 73, define a joint 67 including a joint interface 69. The joint interface 69, as shown in FIG. 22, is characterized by the first and second metal sheets 12, 14 in direct contact with each other, e.g., the first inner surface 56 of the metal sheet 12 is in direct contact with the second inner surface 58 of the metal sheet 14 within the joint 67. The fastened structural feature 45 (see FIG. 21) can include a plurality of fasteners 77A formed in the non-adhered region 84A, where the fasteners 77A can be selectively positioned and/or distributed within the non-adhered region 84A to define a pattern of fasteners 77A defining a selectively localized area of the laminate sheet 200 and/or a structural component 300 formed therefrom, where the localized area is attached, stiffened, work hardened, and/or strengthened by the pattern of fasteners 77A. One or more of the fasteners 77A and/or the fastened structural feature 45 formed therefrom can be formed during forming of the structural component 300 shown in FIG. 18, for example, when stamping the structural component 300, where the stamping tools used to form the structural component 300 are configured to form the fasteners 77A.

Referring to FIG. 23, a non-limiting example of a fastened structural feature 45 formed in a non-adhered region 84A of a structural component 300 is shown. The fastened structural feature 45 is formed by installing a fastener 77B in the first and second metal sheets 12, 14, within the non-adhered region 84A. The fastener 77B may also be known as and/or referred to herein as a clinch nut 77B. The fastener 77B includes a shoulder portion 65 extending radially from a generally cylindrical body, and a generally cylindrical foot portion 63. The foot portion 63 may also be referred to herein as a tang end 63, which prior to installation of the fastener 77B is generally cylindrical in shape. The fastener 77B defines a generally cylindrical cavity 71. In an example method, a hole is formed through the first and second metal layers 12, 14 in the non-adhered region 84A to receive the foot portion 63 of the fastener 77B, such that, with the foot portion 63 inserted into the hole, the shoulder portion 65 abuts the surface of the non-adhered region 84A. A deforming force is applied by a clinching tool (not shown) to the foot and shoulder portions 63, 65 in the direction of arrow 75 to radially expand the foot portion 63 and axially deform the shoulder portion 65 to form the concavity 61 shown in FIG. 23. During clinching and deformation of the fastener 77B, the edges of the first and second metal layers 12, 14 defining the hole are entrapped in the concavity 61 and compressed in direct contact with each other by the deformed foot and shoulder portions 63, 65 to form the joint 67 including the joint interface 69, as shown in FIG. 23. The joint interface 69, as shown in FIG. 23, is characterized by the first inner surface 56 of the metal sheet 12 in direct contact with the second inner surface 58 of the metal sheet 14 within the joint 67. The fastened structural feature 45 (see FIG. 21) can include a plurality of fasteners 77B formed in the non-adhered region 84A, where the fasteners 77B can be selectively positioned and/or distributed within the non-adhered region 84A to define a pattern of fasteners 77B defining a selectively localized area of the laminate sheet 200 and/or a structural component 300 formed therefrom, where the localized area is attached, stiffened, work hardened, and/or strengthened by the pattern of fasteners 77B. In one example, the foot portion 63 can be configured for piercing a hole through the first and second metal layers 12, 14, such that the clinch nut fastener 77B is self-piercing and the need to form a hole in the non-adhered region 84A to receive the foot portion 63 of the fastener 77B is obviated.

Figure 24:
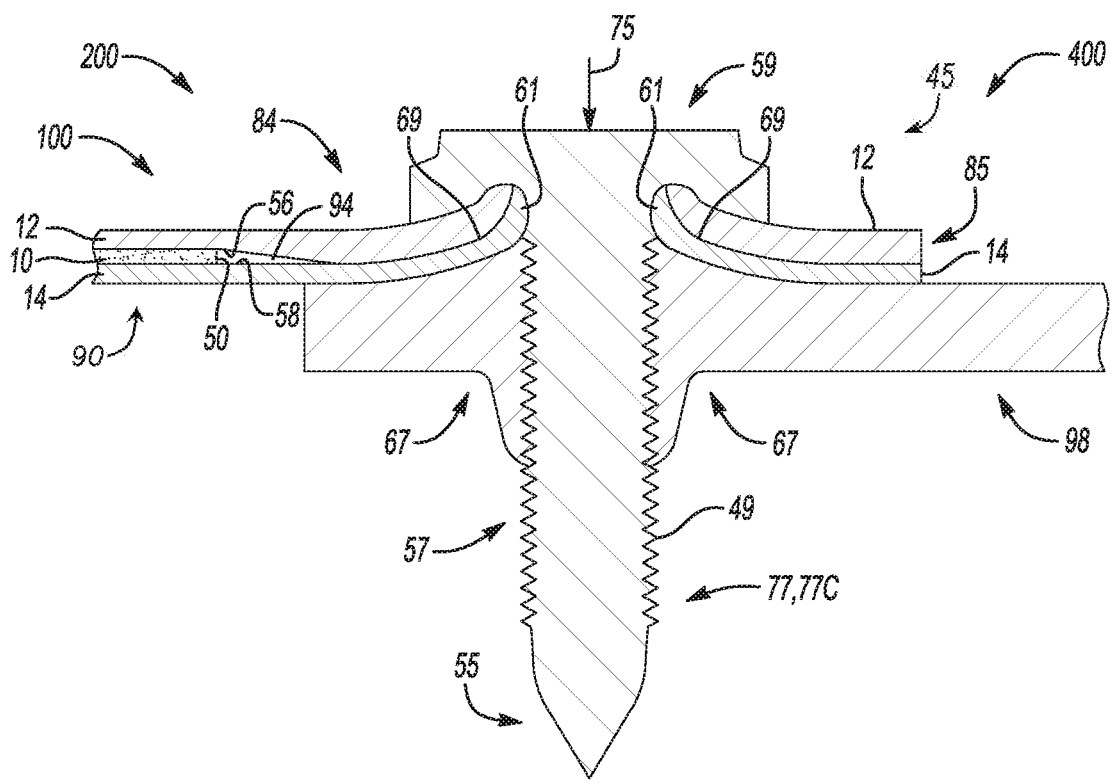
FIG. 24 is a schematic cross-sectional view of section 24-24 of FIG. 21, showing a third example fastened structural feature attaching the non-adhered region of the structural component to the other component to form the assembly of FIG. 21.

Referring to FIG. 24, a non-limiting example of a fastened structural feature 45 formed in a non-adhered region 84 of a structural component 300 (see FIG. 21) is shown. The fastened structural feature 45 is formed by installing a fastener 77C in the first and second metal sheets 12, 14, within the non-adhered region 84. The fastener 77C may also be known as and/or referred to herein as a flow drill screw 77C, and includes, as shown in FIG. 24, a head portion 59, and a shank portion 57 extending from the head portion 59 and terminating in a piercing tip 55. A plurality of threads 49 are formed on the shank portion 57. The head portion 59 is recessed adjacent the shank portion 57 to define an annular concavity 61 as shown in FIG. 24. In the non-limiting example shown in FIG. 24, a method of installing the flow drill screw 77C to form the fastened structural feature 45 includes placing another component 98 adjacent the non-adhered region 84 of the laminate sheet 200 into which the fastener 77C is to be installed, and installing the fastener 77C such that piercing tip 55 pierces through the first and second metal layers 12, 14 and the component 98, such that the threads 49 of the shank portion 57 attach to the component 98 to the laminate sheet 200, thereby forming an assembly 400. In the example method, the fastener 77C is installed by applying an insertion force in the direction of arrow 75 while concurrently rotating the fastener 77C with the piercing tip 55 in contact with the surface of the non-adhered region 84. The frictional heat generated by contact of the rotating piercing tip 55 heats the material of the non-adhered region 84 and the component 98 which is immediately adjacent the fastener 77C as the piercing tip 55 and shank portion 57 penetrate the first and second metals layers 12, 14 and the component 98. The frictionally heated material flows, as shown in FIG. 24, such that material of the component 98 is extended axially along the shank portion 57 by the threads 49 and the edges of the first and second metal layers 12, 14 adjacent the shank portion 57 and head portion 59 flow into the concavity 61 to form the joint 67 including the joint interface 69. The method illustrated by FIG. 24 can be referred to as flow drilling, friction drilling, friction stir drilling, and/or thermal drilling. The joint interface 69, as shown in FIG. 24, is characterized by the first and second metal sheets 12, 14 in direct contact with each other, e.g., the first inner surface 56 of the metal sheet 12 is in direct contact with the second inner surface 58 of the metal sheet 14 within the joint 67. The fastened structural feature 45 (see FIG. 21) can include a plurality of fasteners 77C formed in the non-adhered region 84, where the fasteners 77C can be selectively positioned and/or distributed within the non-adhered region 84 to define a pattern of fasteners 77C defining a selectively localized area of the laminate sheet 200 and/or a structural component 300 formed therefrom, where the localized area is attached, stiffened, work hardened, and/or strengthened by the pattern of fasteners 77C. One or more of the fasteners 77C and/or the fastened structural feature 45 formed therefrom can be formed along a non-adhered region 84 of an edge 85 of the structural component 300 to attach a component 98 to the structural component 300 as shown in FIG. 21.

Referring to FIG. 25, a non-limiting example of a fastened structural feature 45 formed in a non-adhered region 84 of a structural component 300 is shown. The fastened structural feature 45 is installing a fastener 77D in the first and second metal sheets 12, 14, within the non-adhered region 84. The fastener 77D may also be known as and/or referred to herein as a self piercing rivet 77D. The fastener 77D includes, as shown in FIG. 25, a body portion 53, and a foot portion 63 extending from the body portion 53. The foot portion 63, which may also be referred to herein as a tang portion 63, is generally cylindrical prior to installation, and terminates in a piercing tip 55, which may also be referred to herein as a piercing edge 55. The tang portion 63 defines a cavity 71 which is enclosed at one end by the body portion 53 and terminates at the piercing edge 55 at the opposing end. In the non-limiting example shown in FIG. 25, a method of installing the fastener 77D to form the fastened structural feature 45 includes positioning the piercing edge 55 in contact with the non-adhered region 84 of the laminate sheet 200, and applying a riveting force to the fastener 77D in the direction of arrows 75 in FIG. 25, such that the piercing edge 55 of the tang portion 63 pierced the first and second metal layers 12, 14 and penetrates into the component 98. The tang portion 63 is configured such that, as the piercing edge 55 penetrates the first and second layers 12, 14 and the component 98, the tang portion 63 expands radially outward as shown in FIG. 25 to form a concavity 61 defined by the tang portion 63 between the piercing edge 55 and the body portion 53. The first and second layers 12, 14 and the component 98 are deformed and entrapped in the cavity 71 and in the concavities 61 as shown in FIG. 25, to form the joint 67 including the joint interface 69. The joint interface 69, as shown in FIG. 25, is characterized by the first inner surface 56 of the metal sheet 12 is in direct contact with the second inner surface 58 of the metal sheet 14 within the joint 67. The fastened structural feature 45 (see FIG. 21) can include a plurality of fasteners 77D formed in the non-adhered region 84, where the fasteners 77D can be selectively positioned and/or distributed within the non-adhered region 84 to define a pattern of fasteners 77D defining a selectively localized area of the laminate sheet 200 and/or a structural component 300 formed therefrom, where the localized area is attached, stiffened, work hardened, and/or strengthened by the pattern of fasteners 77D.

Referring to FIG. 26, a non-limiting example of a fastened structural feature 45 formed in a non-adhered region 84 of a structural component 300 is shown. The fastened structural feature 45 is installing a fastener 77E in the first and second metal sheets 12, 14, within the non-adhered region 84. The fastener 77E may also be known as and/or referred to herein as a drawn arc stud or a capacitor discharge stud 77E. The fastener 77E includes a head portion 59, a shank portion 57, which in the example shown includes a plurality of threads 49 formed thereon, terminating at a lead end of the shank portion 57. In an example method, the fastener 77E is installed by positioning the head portion 59 adjacent the surface of the non-adhered region 84 to which the fastener 77E is to be attached. The head portion 59 can include an ignition tip (not shown) which protrudes a predetermined distance from the head portion 59, such that the ignition tip, when positioned in contact with the surface of the non-adhered region 84, establishes a gap of predetermined distance between the surface of the non-adhered region 84 and the remainder of the head portion 59. An electrical current is applied to the fastener 77E and is conducted through the ignition tip to generate a controlled electric arc between the head portion 59 and the surface of the non-adhered region 84, such that the adjacent surfaces of the head portion 59 and the non-adhered region 84 become molten, to form a pool of molten material 51. The ignition tip is consumed into the molten pool 51. Contemporaneously with the surfaces becoming molten, application of the electrical current is ceased, extinguishing the electric arc, and the fastener 77E is moved in the direction of arrow 75 shown in FIG. 26 such that the head portion 59 of the fastener 77E moves into the molten pool 51. The molten pool 51 cools and solidifies to form a joint 67 including a joint interface 69. In the example shown in FIG. 26, the molten pool extends through the first and second metal layers 12, 14 to attach the head portion 59 to both layers 12, 14 of the non-adhered region 84. The joint interface 69, as shown in FIG. 26, is characterized by the first and second metal sheets 12, 14 in direct contact with each other, e.g., the first inner surface 56 of the metal sheet 12 is in direct contact with the second inner surface 58 of the metal sheet 14 at the joint 67. Another component (not shown) can be attached to the shank 57 of the fastener 77E, for example, via the threads 49 of the shank portion 57. The fastened structural feature 45 (see FIG. 21) can include a plurality of fasteners 77E formed in the non-adhered region 84A, where the fasteners 77E can be selectively positioned and/or distributed within the non-adhered region 84A to define a pattern of fasteners 77E. In one example, a component (not shown) can be attached to the fastener 77E by threading the component onto the lead end 47 of the threads 49 of the shank portion 57. In another example, a component (not shown) can include one or more holes or apertures which may be configured to correspond to the pattern of fasteners 77E defining the fastened structural feature 45, such that the fasteners 77E can be received into the corresponding holes of the component to be attached, and the component can be attached, for example, by retainers such as nuts fastened to the threaded shank portions 57 of the fasteners 77E.

The examples of fasteners 77 shown in FIGS. 22-26 are non-limiting, and it would be understood that a fastened structural feature 45 can be formed by installing and/or mechanically forming any type of fastener within the non-adhered region 84, for one or more of attaching the metal layers 12, 14 in the non-adhered region 84, selectively work hardening or compressing the metal layers 12, 14 to provide a relative increase in fatigue strength and/or crack resistance in the area including and proximate to the fastened structural feature 45, etc. Other forms of fastening to form a fastened structural feature 45 can include, by way of non-limiting example, crimping, nut and bolt assemblies, screws, rivets including spin and punch rivets, etc.

The illustrative examples provided by the description herein and the related figures are non-limiting, and it would be understood that a plurality of alternative configurations of the laminate sheet 200 exist within the scope of the description incorporating various combinations of the various configurations of the laminate structure 100 and various features of the embodiments of the laminate sheets 200 shown in FIGS. 6-20. For example, the laminate sheet 200 can be formed with a weldable margin 60 extending to the laminate sheet edge 64 on only one side of the laminate sheet 200. In another example, one or more longitudinal non-adhered regions 84 may be separated by one or more longitudinal adhered regions 90 such that the laminate sheet 200 may be longitudinally slit along (within) the longitudinal non-adhered regions 84 into a plurality of slit laminated sheets having a narrower width than the as-laminated sheet 200, each slit sheet having one of the longitudinal adhered regions 90 central to the slit sheet and a margin 60 bordering the one adhered region 90, the margin 60 formed by slitting of the longitudinal non-adhered region 84.

It would be understood that a plurality of alternative configurations of the layers of the laminate structure 100 exist within the scope of the description incorporating various combinations of the metal sheets 12, 14, configurations of the core layer 10, various configurations of the core 16, and various combinations and/or configurations of one or more of intermediate layers 22, 24, auxiliary layers 30, 32, exterior layers 26, 28, separating layers 34, and/or filler particles 36 to provide a laminate structure 100 characterized by a combination of properties and/or features as required by the specified application and/or use of the laminate structure 100 and/or a component formed therefrom. The combination of properties and/or features for which a laminate structure 100 is configured includes a combination of one or more of NVH properties, damping, elongation, tensile strength, shear strength, formability, peel strength, corrosion prevention, thermal and/or electrical properties. The example configurations of laminate structures 100 shown in FIGS. 1-4, and the laminate sheet 200 and structural components 300 shown in FIGS. 5-20 are non-limiting, and it would be understood that the various layers shown in the FIGS. 1-4 and arrangements of adhered and non-adhered regions 90, 84, 84A shown in FIGS. 5-10 may be alternatively configured and/or arranged to provide other configurations of the laminate structure 100, laminate sheet 200, and/or laminate structural components 300 not shown in the figures but included in the scope of the description.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method of forming a weldable structural component having an adhered region and a weld portion, the method comprising:
    forming a laminate sheet by:
        selectively applying a core material to a first metal sheet such that the core material is distributed on only a portion of the first metal sheet to define the adhered region of the laminate sheet;
        wherein the remainder of the first metal sheet is characterized by an absence of core material to define a non-adhered region of the laminate sheet;
        laminating the first metal sheet to a second metal sheet such that the core material is disposed between and bonded to the first and second metal sheets to form the laminate sheet including a core layer made from the core material;
        wherein the core layer includes a core edge defining a boundary between the adhered region and the non-adhered region;
        wherein after laminating to form the laminate sheet:
            the adhered region is defined by the first and second metal sheets and the core layer bonded therebetween; and
            the non-adhered region is defined by a gap between the first and second metal sheets and the absence of the core material in the gap;
            wherein the non-adhered region extends continuously along and adjacent to the core edge to define a weldable margin;
    wherein the weldable margin includes:
        the weld portion immediately adjacent the core edge; and
        a trim portion immediately adjacent the weld portion;
        wherein the weld portion is intermediate the trim portion and the core edge;
    the method further comprising:
        applying a holding force to the trim portion of the laminate sheet; and
        applying a forming force to the adhered region of the laminate sheet while continuing to apply the holding force to the trim portion of the laminate sheet;
    wherein applying the forming force:
        forms the laminate sheet into a structural component including the adhered region and the weld portion; and
        removes the trim portion from the laminate sheet.

2. The method of claim 1, wherein the non-adhered region includes the weldable margin immediately adjacent the core edge and is characterized by a margin width; and
    wherein the margin width is sufficiently wide such that a metal weld joining the first and second metal sheets is formable within the weldable margin, and
    wherein the core edge is unaffected by heat generated by formation of the metal weld.

3. The method of claim 1, wherein the core edge is a continuous core edge; and
wherein the non-adhered region is adjacent the continuous core edge and continuously surrounded by the adhered region;
wherein the weldable margin includes:
the weld portion immediately adjacent the continuous core edge such that the weld portion is a continuous weld portion; and
the trim portion surrounded by the continuous weld portion;
wherein applying the forming force removes the trim portion from the laminate sheet;
wherein removing the trim portion from the laminate sheet forms an aperture in the laminate sheet; and
wherein the aperture is defined by the continuous weld portion.

4. The method of claim 1, wherein the core edge is a continuous core edge; and
wherein the non-adhered region is adjacent the continuous core edge and continuously surrounded by the adhered region;
the method further comprising:
forming a stiffening feature within the non-adhered region;
wherein forming the stiffening feature includes forming a metal weld joining the first sheet directly to the second sheet; and
wherein the metal weld is contained within the non-adhered region of the laminate sheet.

5. The method of claim 1, wherein selectively applying the core material includes:
providing a dry adhesive film made from the core material;
wherein the dry adhesive film is configured to define the adhered region; and
applying the dry adhesive film to the first metal sheet.

6. The method of claim 1, wherein selectively applying the core material includes one of spraying and rolling the core material on the first metal sheet only in the adhered region.

7. The method of claim 1, wherein the core material is one of a viscoelastic material and an acoustic material.

8. The method of claim 1, wherein the core material is an adhesive material.

9. The method of claim 1, further comprising:
forming a fastened structural feature in the non-adhered region;
wherein the fastened structural feature includes a joint interface defined by the first and second metal sheets in direct contact with each other.

10. The method of claim 9, wherein forming the fastened structural feature includes at least one of:
forming a cinch rivet in the non-adhered region;
installing a clinch nut in the non-adhered region; and
welding a stud in the non-adhered region.

11. The method of claim 9, further comprising:
attaching a component to the laminate sheet by forming the fastened structural feature in the non-adhered region;
wherein the fastened structural feature contacts the component to attach the component to the non-adhered region.

12. The method of claim 1, further comprising:
providing a component to be attached to the laminate sheet;
positioning the component adjacent to the weldable margin of the laminate sheet;
attaching the laminate sheet to the component by forming one of a brazed joint and a soldered joint joining the laminate sheet to the component;
wherein the one of the brazed joint and the soldered joint is formed in the weldable margin of the laminate sheet; and
wherein the core edge is unaffected by heat generated during forming of the one of the brazed joint and the soldered joint.

13. The method of claim 1, further comprising:
providing a component to be welded to the laminate sheet;
positioning the component adjacent to the weldable margin of the laminate sheet; and
welding the laminate sheet to the component by forming a metal weld joining the first and second metal sheets to the component; wherein forming the metal weld includes:
positioning metal weld within the weldable margin to form a thermal insulation barrier in the gap between the core edge and the metal weld;
wherein the thermal insulation barrier includes a space within the gap between the core edge and the metal weld; and
wherein the thermal insulation barrier is configured to reduce heat transfer from the metal weld to the core edge such that the core edge is unaffected by heat generated during forming of the metal weld.

14. The method of claim 1, wherein applying the core material to the first metal sheet to define the adhered region further comprises:
forming the adhered region in an irregular shape.

15. The method of claim 1, wherein applying the core material to the first metal sheet to define the adhered region further comprises:
forming the adhered region such that:
the core edge is a continuous core edge;
the non-adhered region is adjacent the continuous core edge; and
the non-adhered region is continuously surrounded by the adhered region.

16. The method of claim 1, wherein the laminate sheet defines a longitudinal axis, and
wherein applying the core material to the first metal sheet to define the adhered region further comprises:
forming the adhered region such that the core edge is parallel to the longitudinal axis.

17. The method of claim 1, wherein applying the core material to the first metal sheet to define the adhered region further comprises:
forming a plurality of core edges;
forming a plurality of non-adhered regions;
wherein each respective core edge defines a respective non-adhered region.

18. The method of claim 17, wherein applying the core material to the first metal sheet further comprises:
forming a first core edge surrounding a first non-adhered region; and
forming a second core edge defining a second non-adhered region.

19. The method of claim 1, wherein the laminate sheet includes a laminate sheet edge;
wherein the non-adhered region extends between the core edge and the laminate sheet edge to define the weldable margin.

* * * * *